United States Patent [19]

Koyama et al.

[11] Patent Number: 5,253,005
[45] Date of Patent: Oct. 12, 1993

[54] SMALL-SIZED CAMERA

[75] Inventors: Takeshi Koyama; Sadatoshi Takahashi; Nozomu Kitagishi, all of Tokyo; Kouji Oizumi, Kanagawa, all of Japan

[73] Assignee: Canon Kabushiki Kaisha, Tokyo, Japan

[21] Appl. No.: 806,786

[22] Filed: Dec. 12, 1991

Related U.S. Application Data

[63] Continuation of Ser. No. 352,729, May 16, 1989, abandoned.

[30] Foreign Application Priority Data

| | | |
|---|---|---|
| May 18, 1988 [JP] | Japan | 63-122452 |
| May 23, 1988 [JP] | Japan | 63-126612 |
| May 23, 1988 [JP] | Japan | 63-126613 |
| May 23, 1988 [JP] | Japan | 63-126614 |
| May 23, 1988 [JP] | Japan | 63-126615 |
| May 23, 1988 [JP] | Japan | 63-126616 |
| Jun. 24, 1988 [JP] | Japan | 63-157677 |
| Jun. 24, 1988 [JP] | Japan | 63-157678 |
| Aug. 10, 1988 [JP] | Japan | 63-199580 |
| Aug. 24, 1988 [JP] | Japan | 63-210162 |
| Oct. 27, 1988 [JP] | Japan | 63-272674 |

[51] Int. Cl.⁵ .......................... G03B 19/12
[52] U.S. Cl. ................................... 354/152
[58] Field of Search .......... 354/150, 152, 153, 154, 354/156, 158

[56] References Cited

U.S. PATENT DOCUMENTS

| | | | |
|---|---|---|---|
| 3,791,274 | 2/1974 | Hansen | 354/150 |
| 3,800,309 | 3/1974 | Land | 354/152 |
| 3,956,759 | 5/1976 | Karikawa | 354/152 |
| 4,037,238 | 7/1977 | Leitz | 354/152 |

FOREIGN PATENT DOCUMENTS

| | | |
|---|---|---|
| 548736 | 1/1979 | Japan . |
| 5499623 | 8/1979 | Japan . |
| 60-114841 | 6/1985 | Japan . |

*Primary Examiner*—David M. Gray
*Attorney, Agent, or Firm*—Fitzpatrick, Cella, Harper & Scinto

[57] ABSTRACT

A small-sized camera in which while the light emerging from a photographic lens having an optical axis parallel with a photosensitive plane is conducted by first and second mirrors to the photosensitive plane to form a photographic system, the first or second mirror is turned around a predetermined axis to conduct the light to an eyepiece lens to form a finder system. And, a structure of construction for efficiently removing the stray light of this camera is disclosed.

21 Claims, 17 Drawing Sheets

SMALL-SIZED CAMERA

This application is a continuation of application Ser. No. 07/352,729 filed May 16, 1989, now abandoned.

BACKGROUND OF THE INVENTION

1. Field of the Invention

This invention relates to optical systems having optical path bending means and, more particularly, to cameras such as photographic cameras or video cameras employing the same. Still more particularly, it relates to a reflex camera suited to achieve a minimization of the size of the entirety of the camera by reducing its vertical thickness.

2. Description of the Related Art

The conventional single-lens reflex type of photographic camera or video camera has its optical system formed as shown in FIG. 1, where a photosensitive plane 53 is arranged on the optical axis of a photographic lens 51 and located behind it to constitute the photographic system.

The optical system further includes a turnable mirror 52, when positioned in between the photographic lens 51 and the photosensitive plane 53, to reflect the light beam entering through the photographic lens 51 to the upper portion of the camera body so that a finder image is formed on a focusing screen 54. Then, the finder image on the focusing screen 54 is observed through a condenser lens 55 and a pentagonal roof type prism 56 so that an erecting non-reverse image appears in an eyepiece lens 57. The finder system is thus constructed and arranged.

It is appreciated that in the conventional single-lens reflex camera, the finder image-bearing beam is reflected upward to the upper portion of the camera body by the turnable mirror 52, and the pentagonal roof type prism 56 arranged as protruding upward from the photographic lens 51 is used to obtain the finder image in the erecting non-reverse attitude. For this reason, the pentagonal roof type prism 56, though constituting only part of the finder system, must be housed as an awkward projection on the upper portion of the camera body. When the photographic lens 51 is attached to the camera body, therefore, the entirety of the camera tends to become relatively big in size.

Meanwhile, Japanese Laid-Open Patent Application No. Sho 54-99623 or Japanese Utility Model Publication No. Sho 54-8736 discloses an optical system which allows the height of the above-described conventional common type of single-lens reflex camera to be shortened. To attain the erecting non-reverse image (correct image) in the viewfinder, however, the total longitudinal length of the camera body is elongated.

In Japanese Laid-Open Patent Application Sho 60-114841, too, there is also disclosed a single-lens reflex camera of shortened height. However, the use of the disclosed technique for meeting the requirement of obtaining the correct image in the viewfinder causes, conversely, the lateral length to increase.

SUMMARY OF THE INVENTION

An object of the present invention is to provide a compact reflex camera.

Another object is to provide a camera whose size is reduced in such a way that an image sensing plane is disposed in parallel with the optical axis of a photographic lens, and first and second mirrors are arranged to direct a light beam emerging from the photographic lens to the image sensing plane when a photographic system operates, and the first or the second mirror is turned around a predetermined axis to direct the light beam to an eyepiece lens when a finder system operates.

Other objects of the invention are disclosed in the drawings and the following description of the embodiments thereof.

Figure 29A:
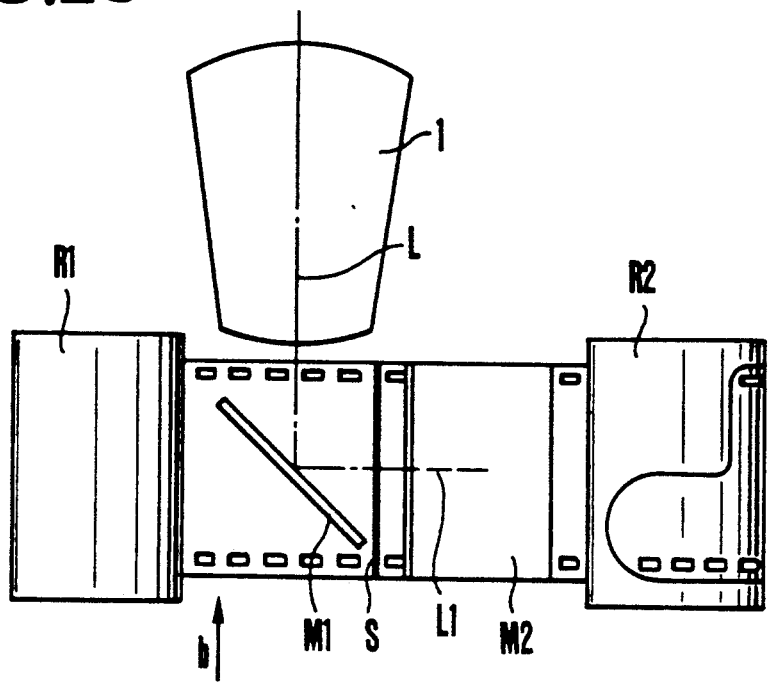
FIGS. 29(A) and 29(B) illustrate the arrangement of the essential parts concerning the invention, FIG. 29(A)
Figure 29B:
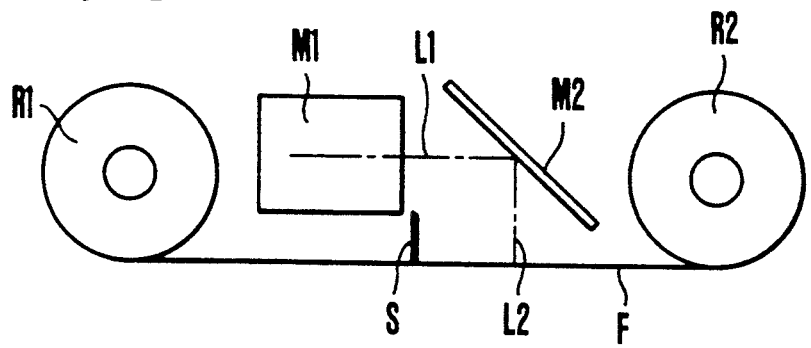

being a top view and FIG. 29(B) being an elevational back view.

Figure 30:
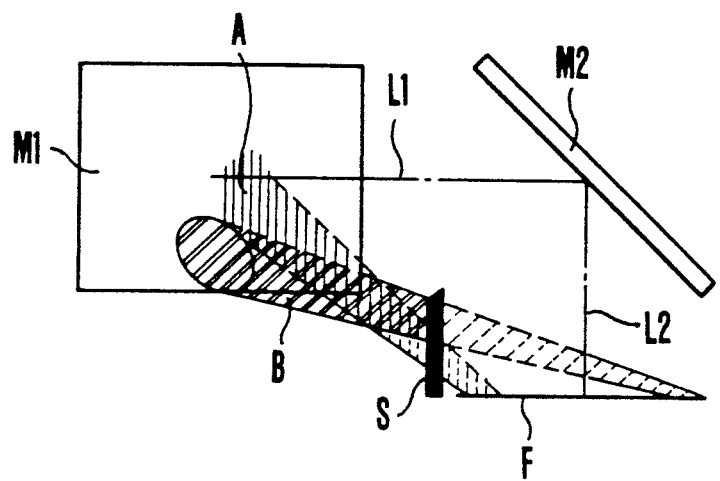

FIG. 30 is a diagram for explaining the effect of a light shielding member S concerning the invention.

Figure 31A:
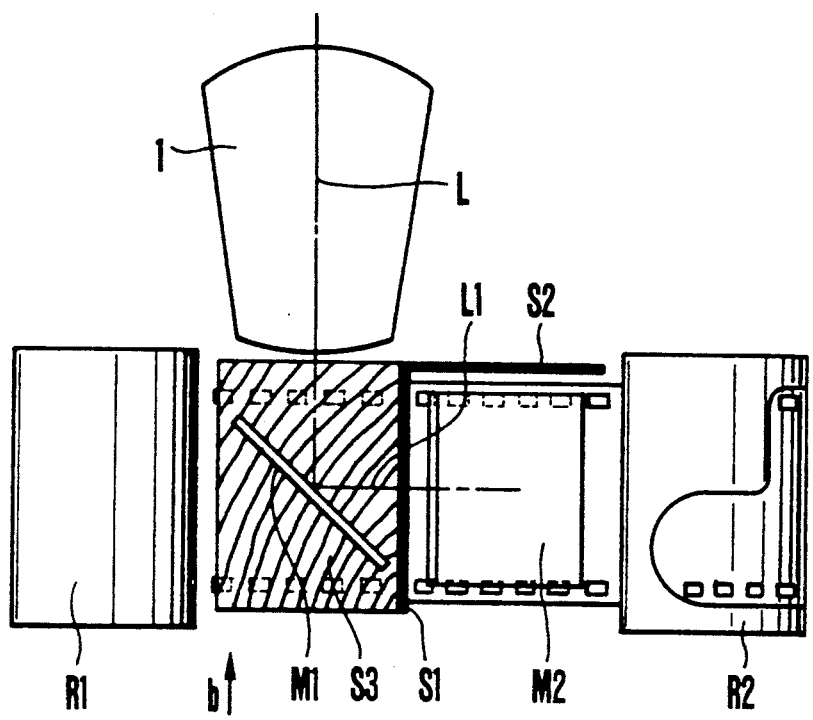
Figure 31B:
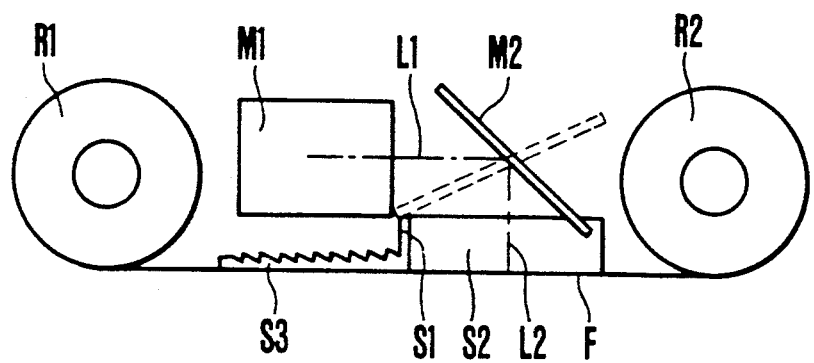

FIGS. 31(A) and 31(B) illustrate the arrangement of the light shielding member S concerning the invention.

DETAILED DESCRIPTION OF THE PREFERRED EMBODIMENTS

Figure 1:
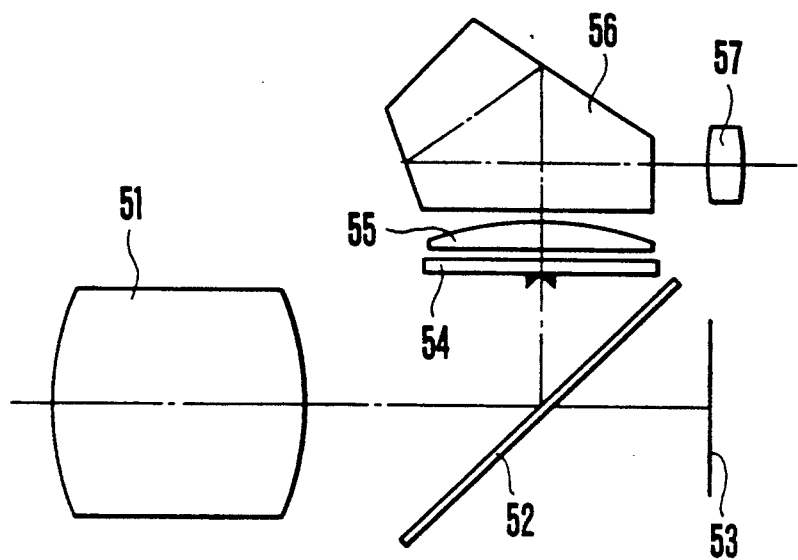
FIG. 1 is a longitudinal sectional view of the conventional common type single-lens reflex camera.
Figure 2:
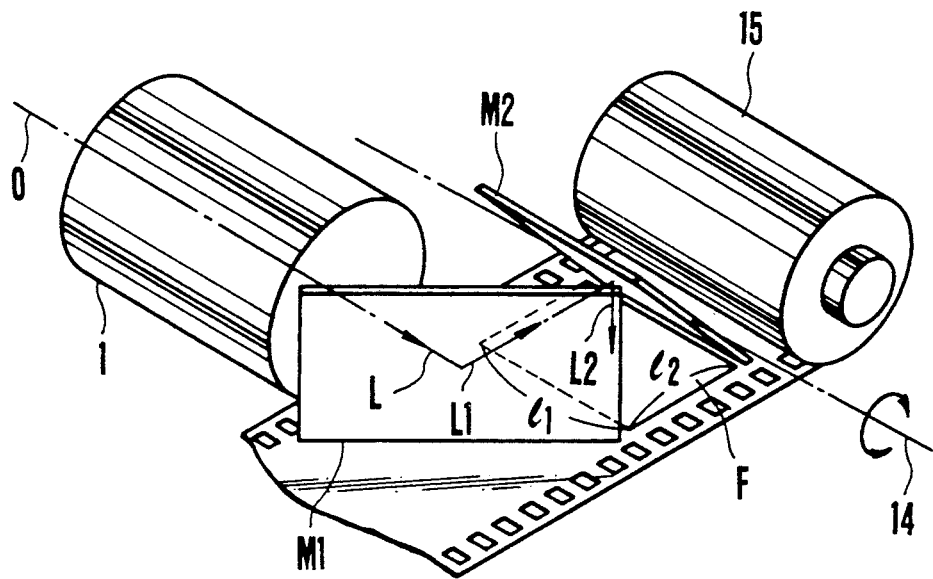
FIG. 2 is a perspective view showing a photographic system of a reflex camera according to the invention.
Figure 3:
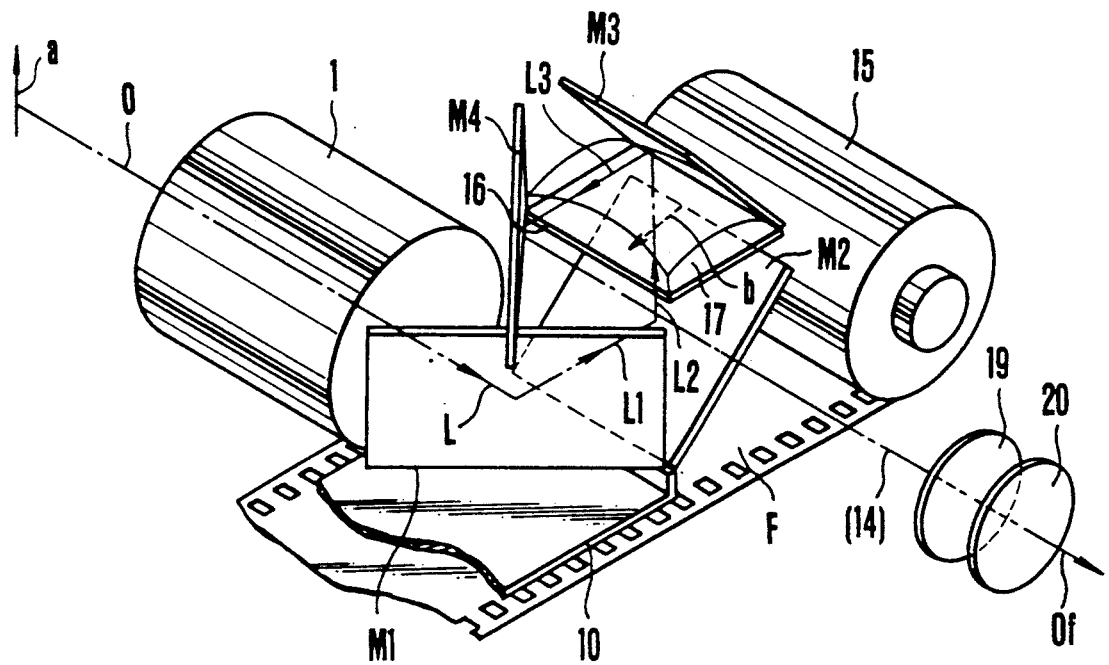
FIG. 3 is a perspective view of a first embodiment according to the invention.

FIG. 2 and FIG. 3 schematically show the essential parts of an optical system having optical path bending means of the invention in two different operative positions for photography and finder observation respectively with their optical paths. In FIG. 2, some parts constituting part of the finder system of FIG. 3 are omitted.

In FIG. 2, a first reflection mirror M1 is disposed at an angle of about 45 degrees with an optical axis O of a photographic lens 1 capable of zooming, so that an on-axial light beam L from the photographic lens 1 is reflected as a first reflected light beam L1 in a direction perpendicular to the optical axis O.

A second reflection mirror M2 is disposed at about a 45 degree angle with respect to the axis of the first reflected light beam L1, so that the first reflected light beam L1 is reflected as a second reflected light beam L2 in a direction almost perpendicular to a first plane formed by the on-axial light beam L of the photographic lens 1 and the first reflected light beam L1 caused by the first reflection mirror M1, and the second reflected light beam L2 is directed to a photosensitive plane F of film or a CCD. Further, the second reflection mirror M2 is rotatably set around an axis 14 either included in that first plane or not included but parallel to that first plane.

In the present embodiment, the photographic lens 1 and the first and second reflection mirrors M1 and M2 constitute a photographic system.

Incidentally, in FIG. 2, reference numeral 15 denotes a film cartridge.

FIG. 3 shows the second reflection mirror M2 which has been turned 90 degrees around the axis 14 from the position of FIG. 2 to constitute a finder system together with other parts of which the essential ones are shown here.

In FIG. 3, the light beam L from the photographic lens 1 is reflected as the first reflected light beam L1 by the first reflection mirror M1 in a direction perpendicular to the optical axis O. Then, the first reflected light beam L1 is reflected as a second reflected light beam L2 by the second reflection mirror M2 going away from the photosensitive plane F in a direction perpendicular to the first plane. The second reflected light beam L2 is directed to a focusing screen 16, on a Fresnel surface of which a finder image "b" of an object "a" is formed.

Further, rays of light radiating from the finder image on the surface of the focusing screen 16 are collected by a condenser lens 17 and are then reflected as a third reflected light beam L3 by a third reflection mirror M3 in a direction perpendicular to the optical axis O. Then, by a fourth reflection mirror M4 having its reflection surface disposed perpendicular to the first plane, the third reflected light beam L3 is reflected in a direction almost parallel to the optical axis O of the photographic lens 1, and then passes through an eyepiece shutter 19 to be conducted to an eyepiece lens 20.

With the arrangement described above, the finder image on the surface of the focusing screen 16 can be observed in the erecting non-reverse attitude through the eyepiece lens 20.

The eyepiece shutter 19 is used for the purpose of preventing backward light from entering through the eyepiece lens 20 to the photosensitive plane F when making an exposure and is positioned adjacent the eyepiece lens 20.

The finder system in the present embodiment has a feature that, for the purpose of making it easy to observe the finder image, the construction and arrangement of the elements is designed so that the optical axis O of the photographic lens 1 and the optical axis $O_f$ of the finder system are almost parallel to each other. Incidentally, reference numeral 10 denotes a light shielding member to be more fully described later.

In the present embodiment, the first to fourth reflection mirrors M1 to M4, the condenser lens 17 and the eyepiece lens 20 constitute part of the finder system.

In the present embodiment, if the used shutter is of the focal plane type as positioned adjacent the photosensitive plane F, the mirror mechanism operates in a similar manner before and after the exposure to that as usual in the single-lens reflex camera.

In the case of the lens shutter in use, for example, while maintaining the lens shutter and the eyepiece shutter in the closed positions, the second reflection mirror M2 is turned 90° around the axis 14 from the finder observing position to the non-observing position. Then, the lens shutter is opened and closed to carry out an exposure. After that, the second reflection mirror M2 is returned to the finder observing position. Then, the lens shutter and the eyepiece shutter are opened again, thus permitting the photographer to look through the finder.

Incidentally, in the embodiment shown in FIG. 2, if the picture frame is of the so-called half size, a camera of extremely small bulk and size is attained. In the horizontal holding position like holding binoculars, a sideways long is obtained.

Figure 4:
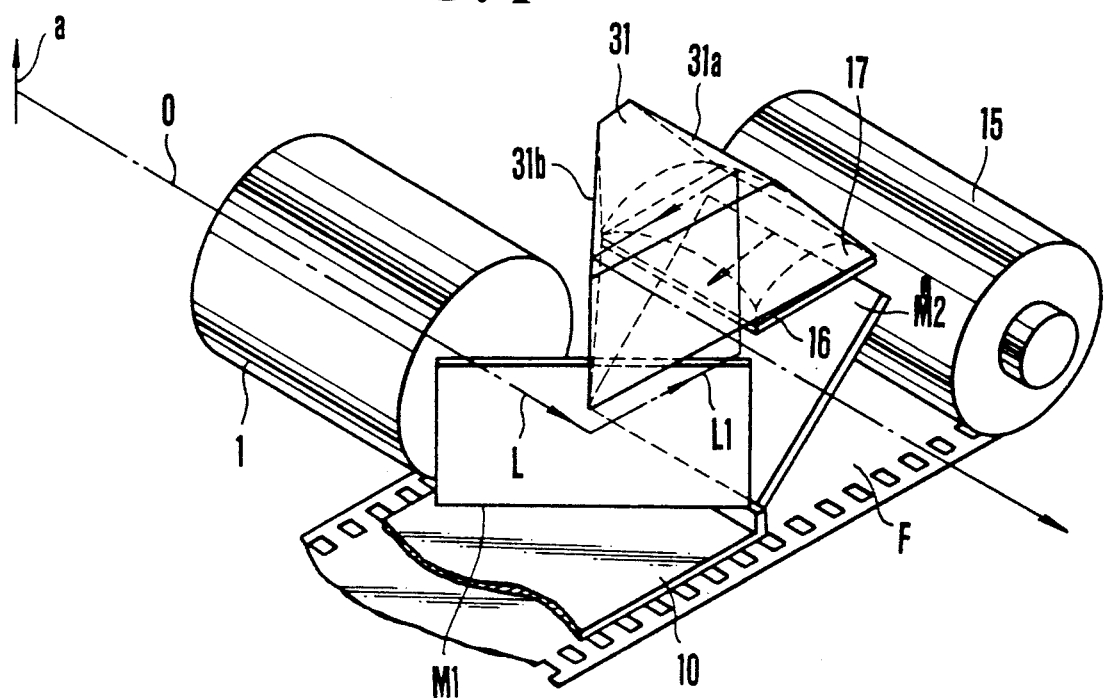
FIG. 4 is a perspective view of a second embodiment according to the invention.

FIG. 4 is a schematic view of essential parts of the invention illustrating the optical path of a finder system constituting part of an optical system having optical path bending means of the invention. In FIG. 4 the same reference numerals are employed to denote elements similar to those shown in FIG. 3.

In the present embodiment, use is made of a reflection type prism 31 in a unified form of the third reflection mirror M3 and the fourth reflection mirror M4 used in the embodiment of FIG. 3. The reflection type prism 31 has two total-reflection surfaces 31a and 31b corresponding to the third and fourth reflection mirrors M3 and M4 respectively.

In the present embodiment, an advantage arising from the use of the reflection type prism 31 of such a form as shown in FIG. 4 in the optical path of the finder is that the length of the optical path is reduced by the air to thereby achieve an increase of the magnification of the finder.

Incidentally, in each of the foregoing embodiments, the first reflection mirror M1 may be replaced by a right-angle prism of the reflection type.

Also, in the invention, the effective area of the film is framed to a format as shown in FIG. 2 by taking the length $l_1$ in a direction parallel to the optical axis O as the long side, and the length $l_2$ in a direction perpendicular to the optical axis O as the short side, thus assisting in reducing the bulk and size of the camera and achieving an increase in the efficiency of usage of the film.

Next, another embodiment is described.

Figure 5:
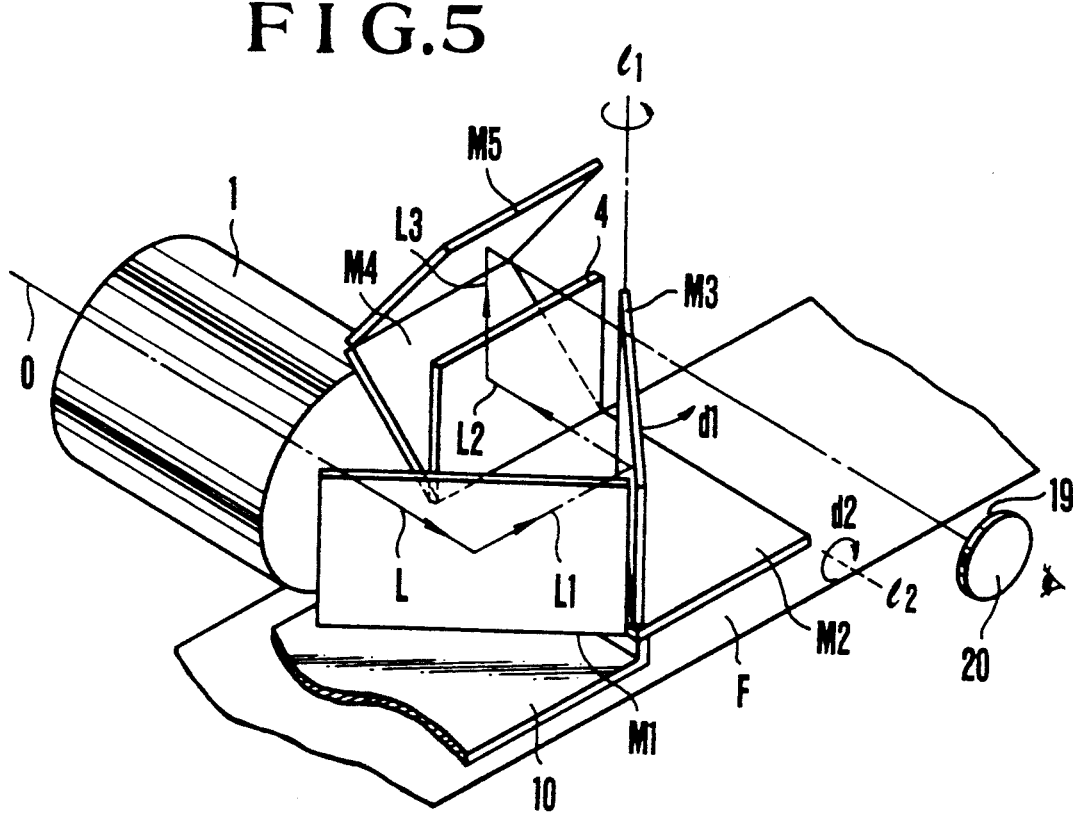
FIG. 5 is a perspective view of a third embodiment according to the invention.

FIG. 5 in perspective view illustrates the optical system of a single-lens reflex camera related to the invention. Incidentally, this perspective view is depicted with the emphasis on the finder system. A photographic lens 1 includes a zoom section and a shutter. F denotes a film plane. A first reflection mirror M1 is disposed 45 degrees with respect to a photographic optical axis O so that a light beam L from the photographic lens 1 is reflected as a light beam $L_1$ in a direction perpendicular to the optical axis O on a plane parallel to the film plane F. A second reflection mirror M2 for conducting the light beam L1 to the film plane F is maintained in a position parallel to the film plane F when the finder image is observed. Meanwhile, when making an exposure, the second reflection mirror M2 is turned to an angular position of 45° with respect to the film plane F so that the light beam L1 is reflected therefrom to the film plane F. A third reflection mirror M3 reflects the light beam L1 in a direction parallel to the optical axis O on a plane parallel to the film plane F. Thus, the light beam L1 goes forth as a light beam L2 toward the object side. Incidentally, the first, second and third reflection mirrors M1, M2 and M3 are set in between a film cartridge 15 and a film take-up chamber (not shown). A focusing screen 4 is positioned adjacent an image plane. A fourth reflection mirror M4 reflects the light beam L2 going away from the film plane F in a direction perpendicular to the optical axis O on a plane perpendicular to the film plane F. Thus, the light beam L2 goes forth as a light beam L3. A fifth reflection mirror M5 conducts the light beam L3 toward an eyepiece lens 20. "e" denotes an eye point. A light shielding member 10 is provided for preventing the film plane F from being fogged.

By such a construction and arrangement of the elements, a finder is formed. That is, by the reflection mirrors M1, M3, M4 and M5, a Porro mirror system is formed. Looking through the eyepiece lens 20, the photographer can observe the image formed on the focusing screen 4 by the photographic lens 1 as the erecting non-reverse image.

Next, a case where when making an exposure, a photographic optical system is established, is described by reference to FIG. 2. FIG. 2 in perspective view shows the photographic optical system established at the time of exposure. Incidentally, here as for the finder optical system, omission is made. Also, an axis of rotation of the second reflection mirror M2 is labeled $l_2$ in FIG. 5.

Now, with the finder optical system in the position of FIG. 5, when an exposure start signal is produced by a release switch (not shown), the third reflection mirror M3 first is turned around an axis $l_1$ in a direction indicated by an arrow $d_1$. Then, the second reflection mirror M2 is turned around the axis $l_2$ in a direction indicated by an arrow $d_2$ and stops in an angular position of 45° with respect to the film plane F as shown in FIG. 2. Then a lens shutter (not shown) is operated. Thus, the exposure to the film plane F can be performed. Incidentally, in the present embodiment, an eyepiece shutter 19 is provided as arranged upon setting to the non-viewing position to close so that the backward leak of light is hindered from fogging the film plane F.

Figure 6:
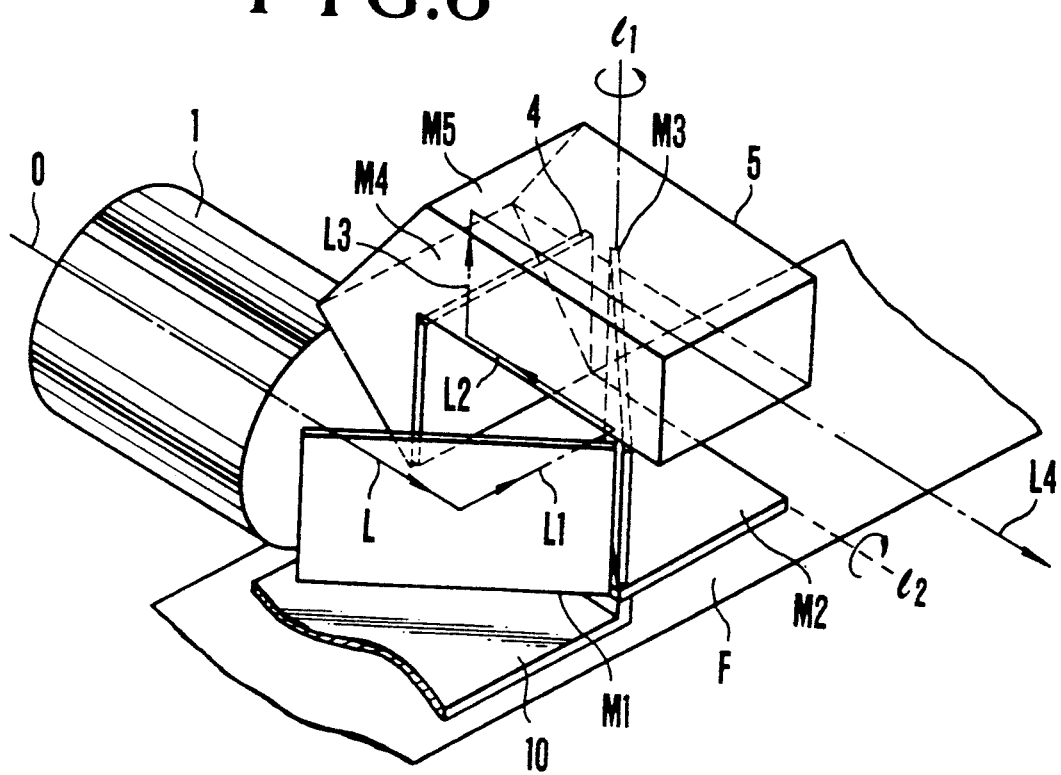
FIG. 6 is a perspective view of a fourth embodiment according to the invention.

Next, a fourth embodiment is shown in FIG. 6. In this embodiment, as different parts from the above-described embodiment, a prism body is arranged in the optical path from the focusing screen 4 to constitute the fourth and fifth reflection mirrors. In this embodiment, by shortening the air reduced length of the interior of the finder, the finder magnification is earned.

Figure 7:
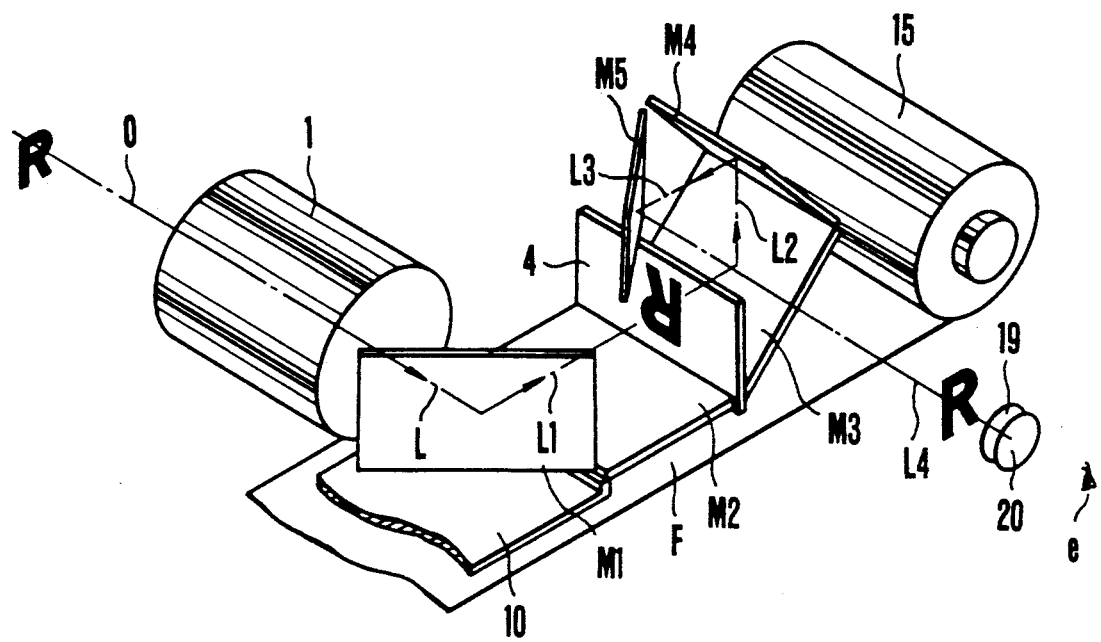
FIGS. 7 and 8 are perspective views of a fifth embodiment according to the invention.

Next, a fifth embodiment is shown in FIG. 7. A focusing screen 4 is arranged in the position of an image formed by the photographic lens 1. Incidentally, though not shown, a condenser lens is arranged adjacent this image plane. A third reflection mirror M3 reflects the light beam L1 reflected by the first reflection mirror M1, in a direction perpendicular to the film plane F going away from the film plane F. A fourth reflection mirror M4 reflects the light beam L2 reflected by the third reflection mirror M3 in a direction opposite to the light beam L1. A fifth reflection mirror M5 reflects the light beam L3 in the same direction as the optical axis O, conducting it to the eyepiece lens 20. Reference numeral 15 denotes a film cartridge. 10 denotes a light shielding member provided for preventing the film from being fogged. "e" denotes an eye point.

Under such an arrangement, a TTL (Though The Lens) type finder is built up. With this finder, when the camera is held in the horizontal position like binoculars, a finder image in the erecting non-reverse attitude can be observed.

Figure 8:
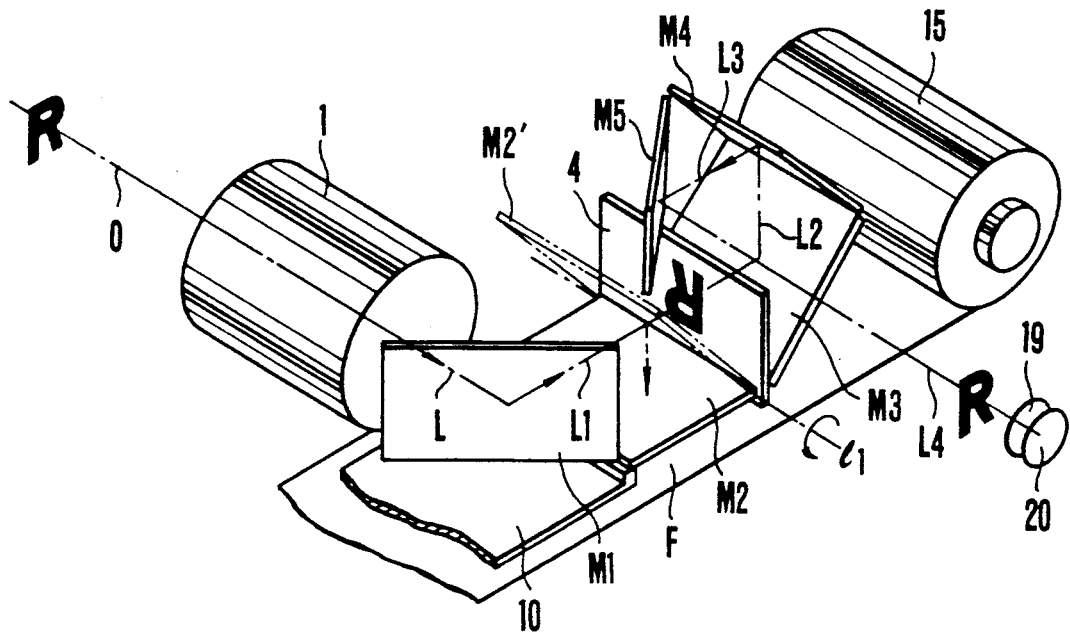

Next, when exposing the film, that is, when a camera release is actuated, an exposure start signal is produced by a release switch (not shown), thereby turning the second reflection mirror M2, as shown in FIG. 8, around an axis $l_1$ that passes the right hand long side edge to an angular position shown by broken lines. While it is maintained in that position, the shutter is opened and closed to make an exposure. Thus, a photographic optical system is formed. Subsequently, after the predetermined exposure time, the second reflection mirror M2 returns to the position of FIG. 7 again.

Figure 9:
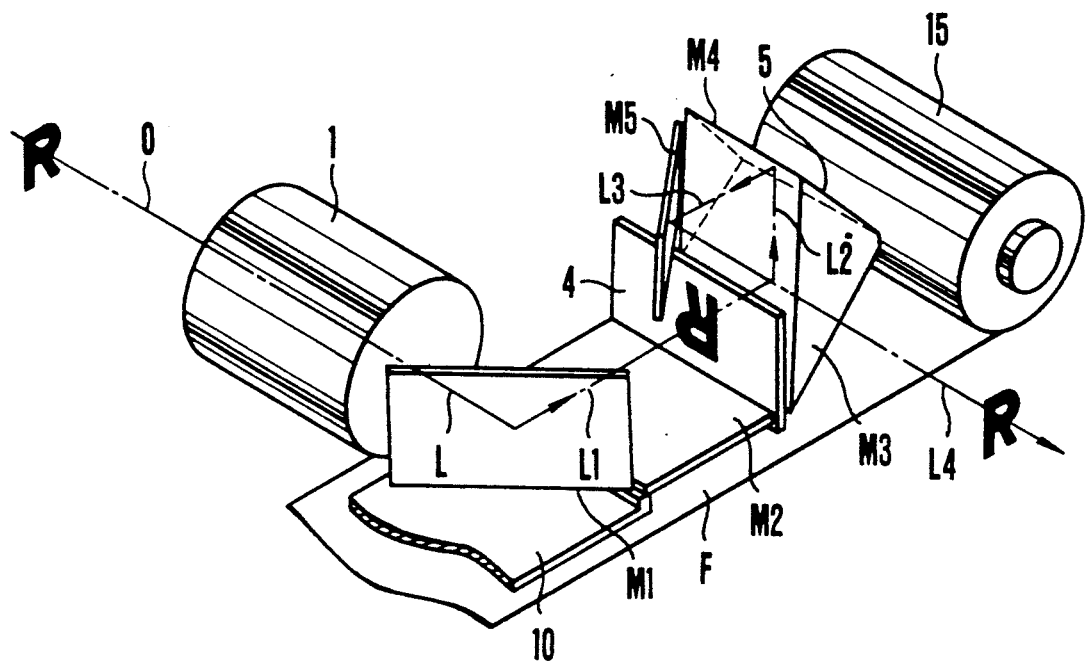
FIG. 9 is a perspective view of a sixth embodiment according to the invention.

Though, in the foregoing embodiment, the reflection mirrors M3, M4 and M5 each are constructed in the form of a parallel flat plate having a mirrored coating, they may otherwise be constructed in part or as a whole by a prism body. If so, it is also possible to increase the length of the optical path with improvement of the finder magnification. An embodiment for this is shown in FIG. 9, where the third and fourth reflection mirrors are replaced by a prism 5.

Figure 10:
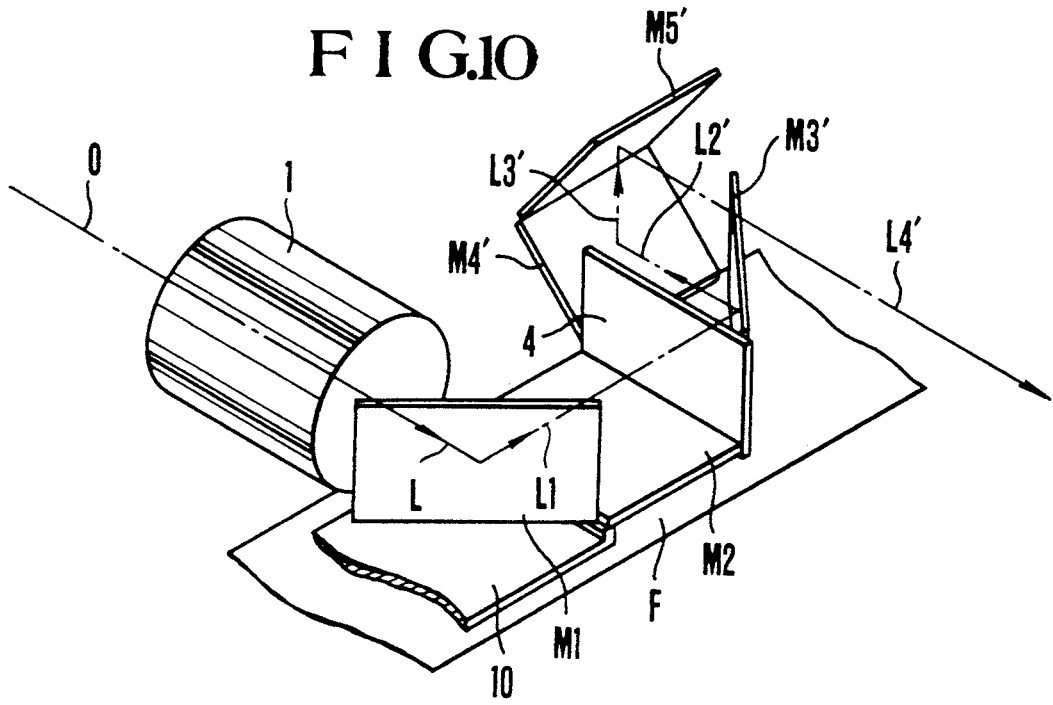
FIG. 10 is a perspective view of a seventh embodiment according to the invention.

Next, a further embodiment is shown in FIG. 10. Here, the finder system is constructed in a form different from the above-described embodiment. The reference characters or numerals each denote the members corresponding to those shown in FIG. 7. The finder system is included with three reflection mirrors M3', M4' and M5'. By the reflection mirror M3', the light beam L1 is bent in a direction opposite to that of the light beam L. The reflected light beam L2' is then bent by the reflection mirror M4' upward at right angles. Then by the reflection mirror M5', the reflected light beam L3' is bent in a direction parallel to the light beam L on the optical axis O, reaching the eye of the observer. This arrangement also forms a Porro mirror system by the reflection mirrors M1, M3', M4' and M5'. Therefore, the finder image in erecting a non-reverse attitude can be observed. Even in this case, some of them may be replaced by a prism.

Figure 11:
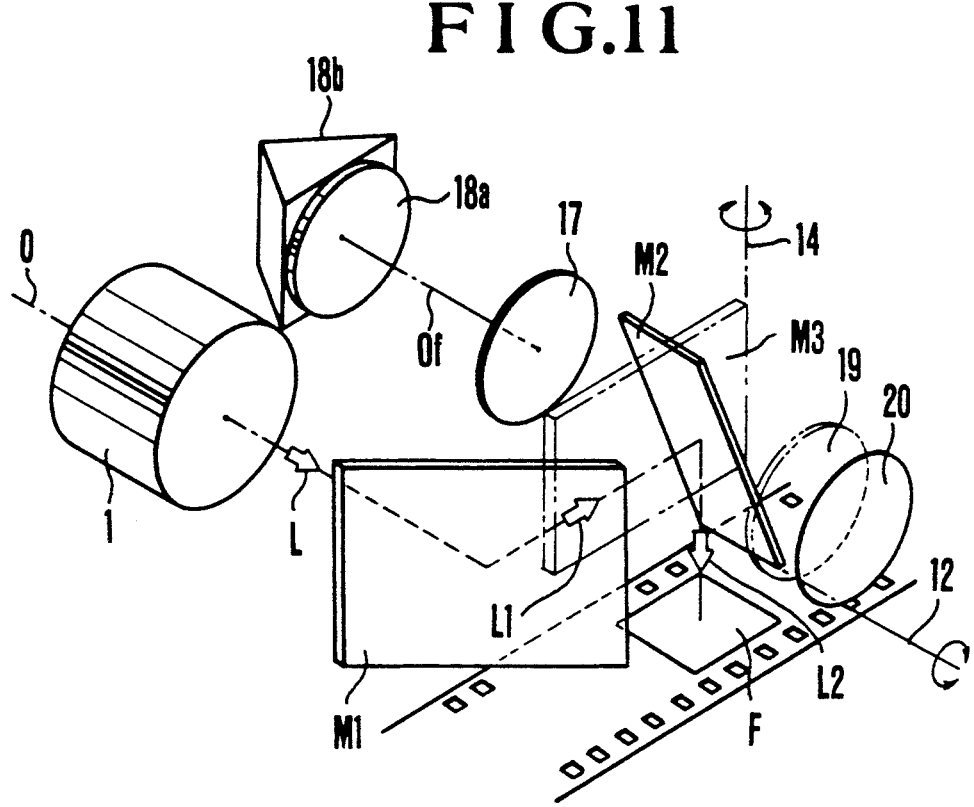
FIGS. 11 and 12 are perspective views of an eighth embodiment according to the invention.
Figure 12:
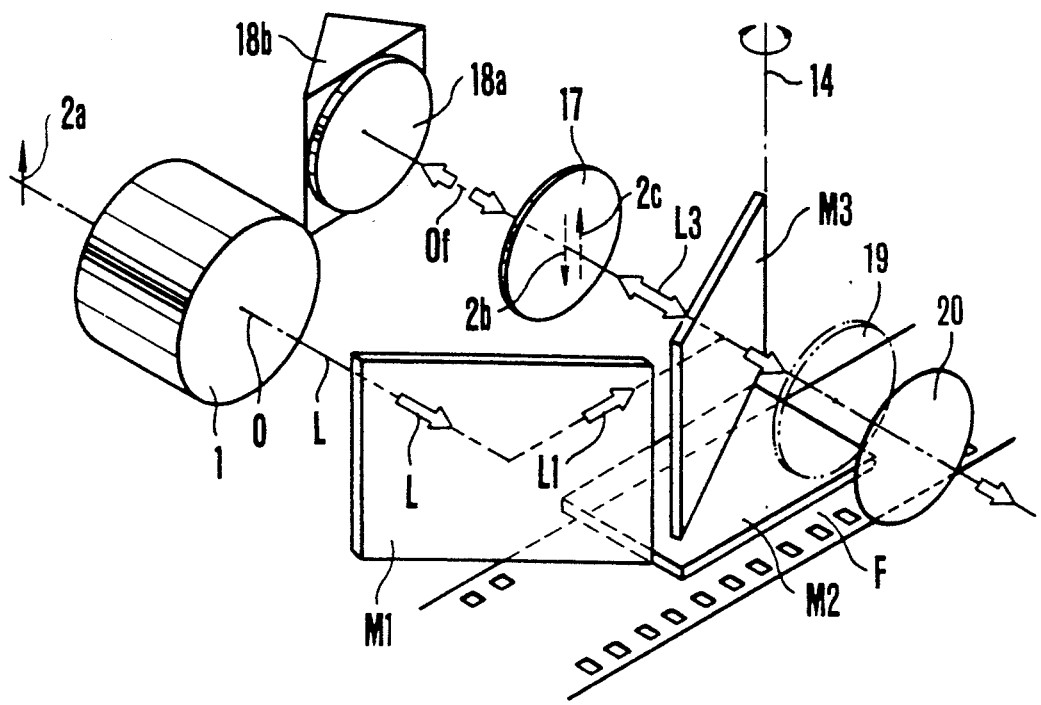

Next, an eighth embodiment is described with reference to FIG. 11 and FIG. 12. At first, it should be pointed out that the photographic system takes a similar form to that described above. Therefore, its explanation is omitted here. A finder system is then described below. A change-over from the photographic system of FIG. 11 to the finder system of FIG. 12 takes place as follows. At first, the second reflection mirror M2 is turned around an axis 12 to retract from the photographic optical path as shown in FIG. 12 to an arbitrary position above the photosensitive plane F. Then, a half-reflection mirror M3 is turned a predetermined angle around an axis 14 perpendicular to the first plane to a position shown by solid lines in the photographic optical path. Then, as the lens shutter is used in the photographic lens 1, the shutter is opened. Thus, the photographic system is changed over to the finder system.

It should be noted that, in the present embodiment, the second reflection mirror M2 when retracting from the photographic optical path may cover the entire area of a film gate above the photosensitive plane F. In this case, the second reflection mirror M2 serves as a light shielding member.

In FIG. 12, the first reflected light beam L1 from the first reflection mirror M1 is reflected by the half-reflection mirror M3 in a direction parallel to the optical axis O of the photographic lens 1 and toward the object side. The third reflected light beam L3 from the half-reflection mirror M3 forms a primary image 2b of an object 2a on a plane near a field lens 17 arranged in an optically conjugate position to the image plane of the photographic lens 1. The primary object image 2b is in the vertically inverted, horizontally non-reverse attitude.

Then, the rays of light from the primary object image 2b go past an image forming lens 18a. By using roof reflection surfaces 18b, they are then caused to go back along the original optical path. By the image forming action of the image forming lens 18a, they are again focused to form a secondary object image 2c of erecting non-reverse attitude on a plane near the field lens 17. Then, the secondary object image 2c is observed through the half-reflection mirror M3 by the eyepiece lens 20. Incidentally, the roof reflection surface 18b are perpendicular to a plane defined by the light beam L and the third reflected light beam L3. Reference numeral 19 denotes an eyepiece shutter provided near the eyepiece lens 20 to prevent backward leaking light from the eyepiece lens 20 from entering the photosensitive plane F.

The finder system in the present embodiment has its elements set up so that the optical axis O of the photographic lens 1 and the optical axis $O_f$ of the finder system are almost parallel to each other for the purpose of making it easy to observe the finder image.

In the present embodiment, to prevent the photosensitive plane F from being fogged when the finder image is observed, either the second reflection mirror M2 may be utilized or a light shielding member, for example, a focal plane shutter, may be arranged behind the film gate but above the photosensitive plane F.

In the present embodiment, the first, second reflection mirrors M1, M2 and half-reflection mirror M3 each constitute part of the optical path bending means.

In the present embodiment, by using the roof reflection surfaces 18b, the optical path of a portion of the finder system is used in both ways to achieve effective utilization of the space within the camera housing. Thus, a reduction of the size of the whole optical system is achieved. Instead of the roof reflection surfaces 18b, another optical member having an equivalent function may be used. Another advantage arising from the use of one field lens and one image forming lens in both ways is that the share of the refractive power of each of these lenses is made less than when they would be used in the single way. Thus, a high optical performance is obtained.

Next, for example, in the case of the lens shutter in the photographic lens 1, the process for switching the camera from the finder system to the photographic system comprises the steps of:

(a) closing the lens shutter in the photographic lens;
(b) closing the eyepiece shutter 19; and
(c) retracting the half-reflection mirror M3 from the photographic optical path and then introducing the second reflection mirror M2 into the photographic optical path.

After that, the photographer will release the lens shutter. The photosensitive plane F can then be exposed. To switch the camera from the photographic system to the finder system, the above-described process may be reversed. It should be noted that the order of the above steps (a) and (b) may indisputably be reversed.

In the present embodiment, a focal plane shutter may be used in front of the photosensitive plane F. In this case, the above-described step (a) becomes unnecessary. Instead, the diaphragm in the photographic lens is adjusted to a proper setting before the focal plane shutter is opened and closed to expose the photosensitive plane F.

It should be noted that in the present embodiment, instead of setting up the optical axis O and the optical axis $O_f$ in parallel with each other, they may be obliquely arranged according to the aim of the present invention.

Next, a ninth embodiment is described by reference to FIG. 13. Likewise, since the photographic system takes a similar form to that described above, its explanation is omitted. And, the finder system is described.

Figure 13:
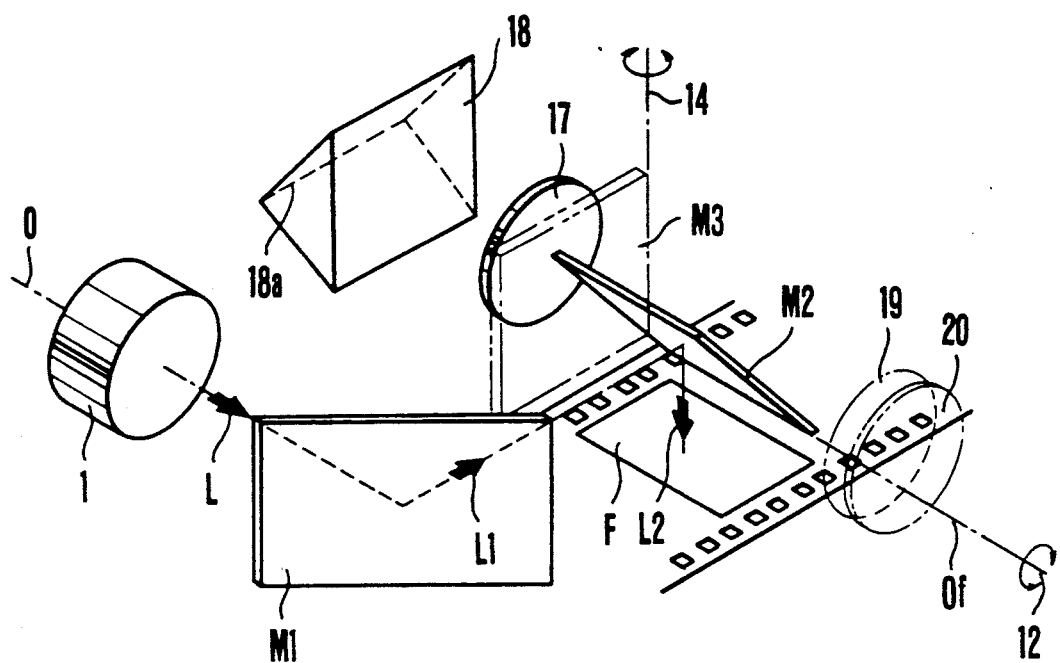
FIGS. 13 and 14 are perspective views of a ninth embodiment according to the invention.
Figure 14:
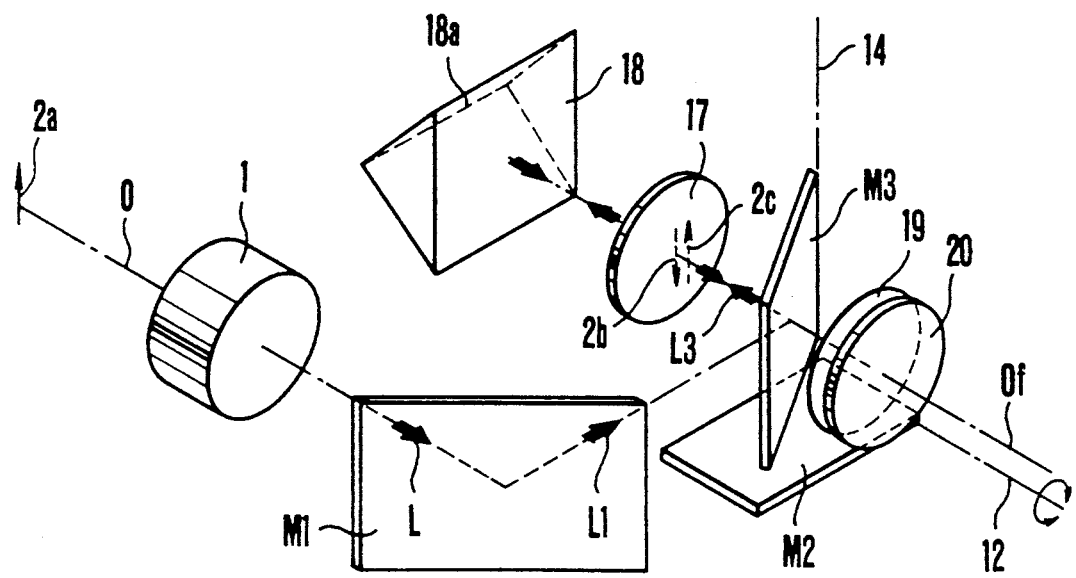

A change-over from the photographic system of FIG. 13 to a finder system of FIG. 14 takes place as follows: at first, the second reflection mirror M2 is turned around the axis 12, being retracted from the photographic optical path as shown in FIG. 14 to an arbitrary position on the photosensitive plane F. Then the half-reflection mirror M3 is turned by a predetermined angle around the axis 14 perpendicular to the aforesaid first plane to a position shown by the solid lines in the photographic optical path. Then, as the lens shutter is arranged in the photographic lens 1, the lens shutter is then opened. Thus, the camera has switched from the photographic system to the finder system.

It should be noted that in the present embodiment the second reflection mirror M2 when retracting from the photographic optical path may be placed so as to cover all the area of the exposure aperture above the photosensitive plane F. In other words, a additional function of shielding the photosensitive plane F from leaking light may be imparted into the second reflection mirror M2.

In FIG. 14, the first reflected light beam L1 from the first reflection mirror M1 is reflected by the half-reflection mirror M2 in a direction parallel to the optical axis O of the photographic lens 1 and toward the object side. The third reflected light beam L3 from the half-reflection mirror M3 forms a primary image 2b of an object 2a on a plane near the field lens 17 arranged in an optically conjugate position to the image plane of the photographic lens 1. The primary object image 2b is in the vertically inverted, horizontally reversed attitude.

The rays of light from the primary object image 2b enter a roof type prism (roof type reflector) 18 with the common edge 18a of its roof surfaces being included in the first plane and exit therefrom, going backward along the original optical path to focus again near the field lens 17 with a secondary object image 2c formed thereby in the vertically erecting, horizontally non-reverse attitude. Then, the secondary object image 2c is observed past the field lens 17 and the half-reflection mirror M3 by the photographer looking through the eyepiece lens 20.

In the present embodiment, the field lens 17, when the third reflected light beam L3 from the half-reflection mirror M3 passes therethrough, functions optically as a field lens, and, for the returning light beam as reflected from the roof type prism 18, functions to optically constitute an observing system together with the eyepiece lens 20.

An advantage arising from the use of the roof type reflection member 18 is that the optical path of a portion of the finder system can be twice used to increase the efficiency of utilization of the space in the camera housing. This leads to a reduction of the bulk and size of the whole optical system. Instead of the roof type reflector 18, another optical member having an equivalent function may be used. Another advantage arising from the use of one field lens in both ways is that the required refractive power of the field lens is made less than when it would be used in a single monomer, so that a high optical performance is obtained.

Figure 15:
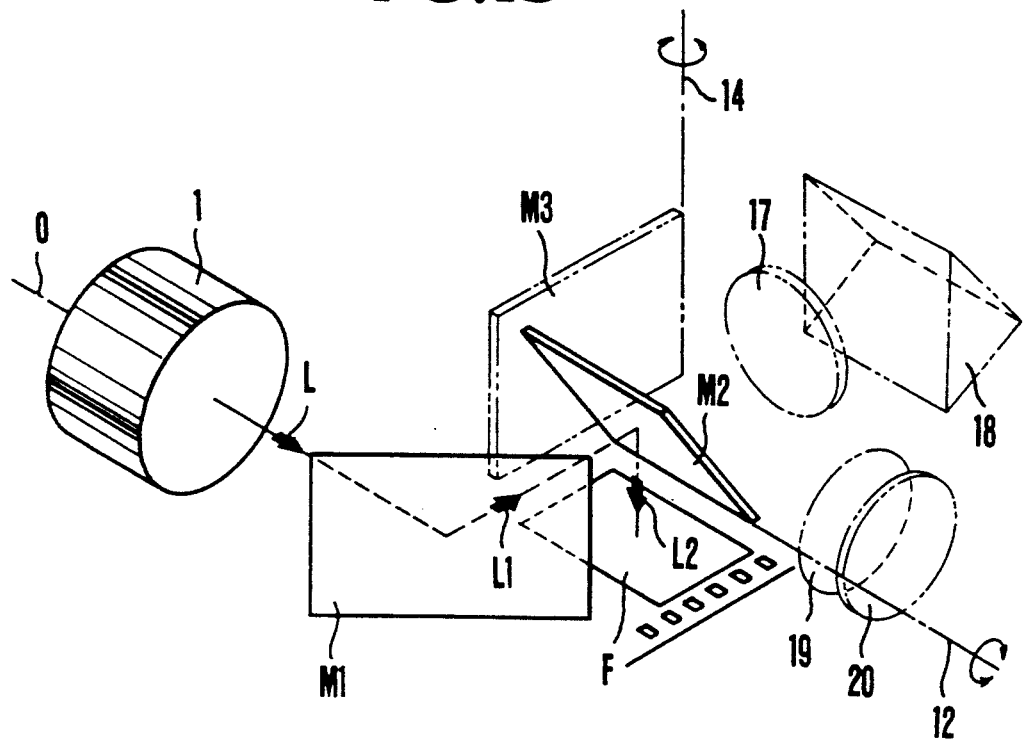
FIGS. 15 and 16 are perspective views of a tenth embodiment according to the invention.
Figure 16:
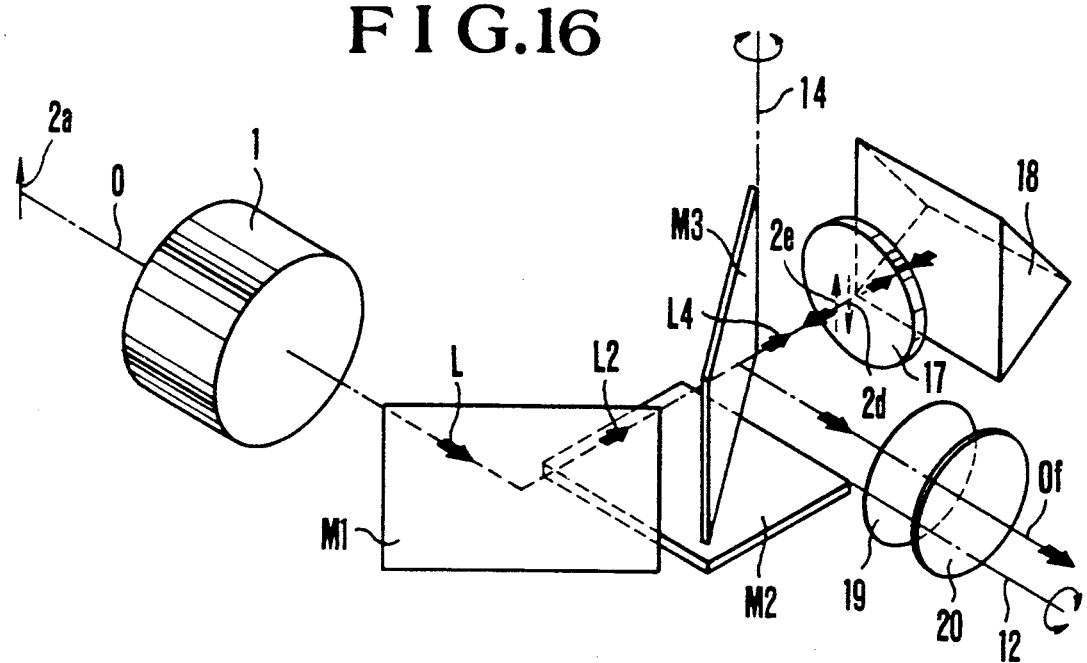

FIG. 15 and FIG. 16 show respectively the photographic system and the finder system of a tenth embodiment of the optical system having optical path bending means according to the invention with their essential parts only displayed schematically to clarify the optical paths.

The present embodiment is similar to the ninth embodiment of FIGS. 13 and 14 in the structure of the photographic system. While in the ninth embodiment the reflected light beam from the half-reflection mirror M3 is used for forming the finder system, it is in the present embodiment that the light beam that has passed through the half-reflection mirror M3 is used for forming the finder system. This is the different point from the ninth embodiment.

The photographic system shown in FIG. 15 of the present embodiment is similar in construction to that of the ninth embodiment of FIG. 13. So its explanation is omitted. A finder system shown in FIG. 16 is explained below. A change-over from the photographic system of FIG. 15 to the finder system of FIG. 16 is performed in a similar manner to that in the ninth embodiment. At first, the second reflection mirror M2 is turned around the axis 12, being retracted as shown in FIG. 16 from the photographic optical path to an arbitrary position on the photosensitive plane F. Then, the half-reflection mirror M3 is turned a predetermined angle around the axis 14 perpendicular to the first plane, moving into a position shown by the solid lines in the photographic optical path. Then, in the case of the lens shutter used in the photographic lens 1, the lens shutter is then opened. Thus, the camera has been switched from the photographic system to the finder system.

In FIG. 16, the first reflected light beam L1 from the first reflection mirror M1 is allowed to pass through the half-reflection mirror M3. The passed light beam L4 from the half-reflection mirror M3 forms a primary image 2d of an object 2a on a plane near a field lens 17 arranged in an optically almost conjugate position to the image plane of the photographic lens 1. The primary object image 2d is in the vertically inverted, horizontally non-reverse attitude.

Next, the rays of light from the primary object image 2d are returned backward by using the roof type reflection surfaces, and travel along the original optical path, and are focused again on a plane near the field lens 17. A secondary object image 2e formed thereby is in the erecting non-reverse attitude. The rays of light from the secondary object image 2e are then reflected by the half-reflection mirror M3 in a direction parallel to the optical axis O, permitting it to be observed by the photographer looking through the eyepiece lens 20.

For the purpose of making it easy to observe the finder image, similar to the first embodiment, the finder system in this embodiment has its elements set up so that the optical axis O of the photographic lens 1 and the optical axis $O_f$ of the finder system are parallel to each other.

It should be noted in connection with the present embodiment that instead of setting the optical axis O and the optical axis $O_f$ to be parallel to each other they may be obliquely arranged.

Though, in the foregoing first to tenth embodiments, the second reflection mirror M2 is made turnable to form the finder system, the first reflection mirror M1 may be turned instead. So, a number of embodiments employing this method in forming the finder system will next be described.

Figure 17:
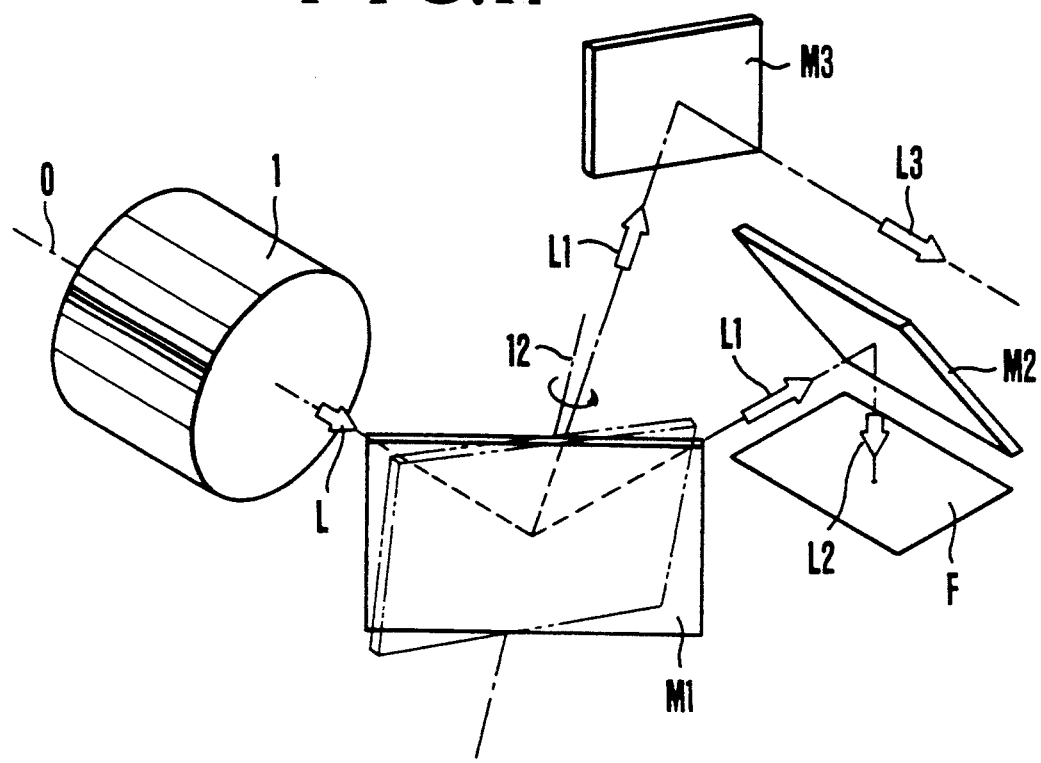
FIG. 17 is a perspective view of an eleventh embodiment according to the invention.

Referring first to FIG. 17, there is shown one embodiment. Even here, the first and second reflection mirrors form a similar photographic system to that described above. Next, the first reflection mirror M1 is turned a predetermined angle around an axis 12 which is inclined by a predetermined angle from the normal to the aforesaid first plane, thereby forming a finder system. Incidentally, all the lenses included in the finder system are omitted in FIG. 17.

In FIG. 17, when the first reflection mirror M1 is turned around the axis 12 by a predetermined angle, the first reflected light beam L1 is deflected to a third reflection mirror M3 positioned on the photographic lens 1 side. Then, a third reflected light beam L3 from the third reflection mirror M3 is allowed to pass by the back side, or non-reflection surface side, of the second reflection mirror M2, thus reaching the eyepiece lens (not shown).

In the present embodiment, the light beam L, the first reflected light beam L1 and the third reflected light beam L3 exit on one and the same plane which is inclined by a predetermined angle to the aforesaid first plane. Incidentally, when the finder system is in use, a shutter as the light shielding member (not shown) is spread over the photosensitive plane F.

In the present embodiment, the first, second and third reflection mirrors each constitute part of the optical path bending means.

Figure 18:
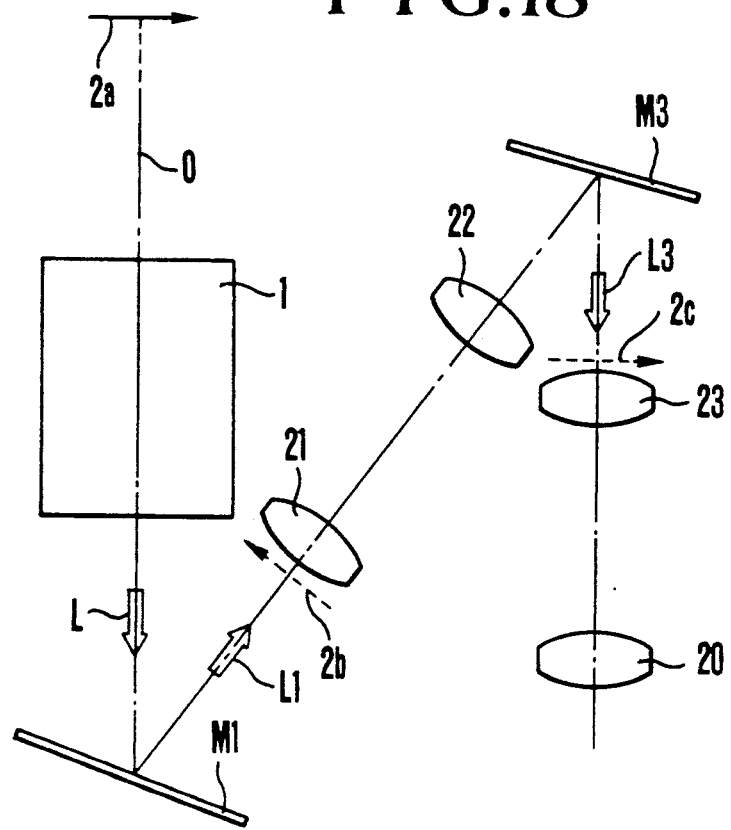
FIG. 18 is a sectional view of a finder system of the eleventh embodiment.

FIG. 18 in schematic diagram shows the relationship of image formation with the aforesaid mirrors in the finder system, taking one practical example of an arrangement of lenses for light collection or for image formation in those optical paths which are considered necessary. In FIG. 18, the light beam L from the photographic lens 1, after having been reflected from the first reflection mirror M1, forms a primary image 2b of an object 2a on a plane near a first field lens 21. The primary object image 2b formed near the first field lens 21 is focused by an image forming lens 22 through a third reflection mirror M3 to form a secondary object image 2c of erecting non-reverse attitude near a second field lens 23. Then, the secondary object image 2c is observed by the eyepiece lens 20. Thus, a finder system is formed.

In the present embodiment, for making it easy to observe the finder image, when constructing the finder system, the first reflection mirror M1 and the third reflection mirror M3 are arranged to be parallel to each other.

In the present embodiment, to shorten the length of the optical path of the whole finder system to achieve a reduction of the bulk and size of the lens system, it is proper to arrange a lens of positive power at the optical path from the first reflection mirror to the plane on which the primary object image is formed.

Figure 19:
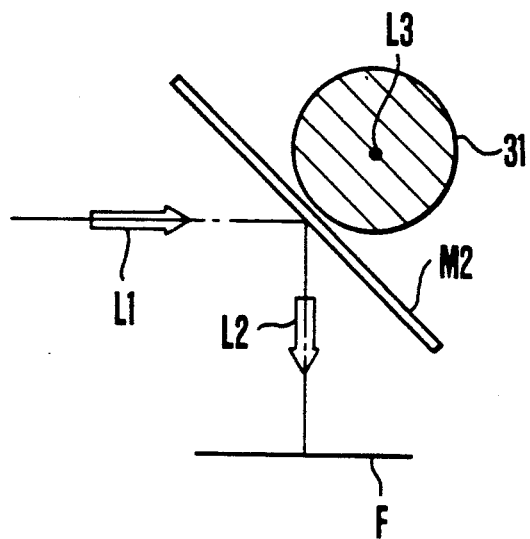
FIG. 19 is an elevational view illustrating the spatial relationship of the observing position and the mirror $M_2$ of the eleventh embodiment.

FIG. 19 is a schematic view illustrating the diameter of the light beam near the second reflection mirror M2 as viewed from the eyepiece lens 20 toward the third lens reflection mirror M3 in the present invention.

Particularly, in the same figure, there is shown the relationship of the first and second reflected light beams L1 and L2 by the photographic system with the third reflected light beam L3 by the finder system.

In the same figure, reference numeral 31 denotes a bundle of all rays of light reflected from the third reflection mirror M3 by the finder system. In the present embodiment, all the elements are so set up that the third reflected light beam L3 corresponding to the center of the light bundle 31 passes across a domain above the aforesaid first plane and behind the second reflection mirror M2. Thereby, the space within the camera housing is effectively utilized to facilitate the reduction of the bulk and size of the whole camera.

In the present embodiment, the positions and inclinations of all the elements may otherwise be designed so that the light bundle 31 shown in FIG. 19 passes in the space defined by the second reflection mirror M2 and the photosensitive plane F.

Next, a twelfth embodiment is shown, where the elements 20, 21, 22 and 23 shown in FIG. 18 are applied, so that they fulfill similar functions. Therefore, these functions and their effects are not further explained here. But, the characteristic features of the optical paths will next be described by reference to FIGS. 20, 21(A) and 21(B).

Figure 20:
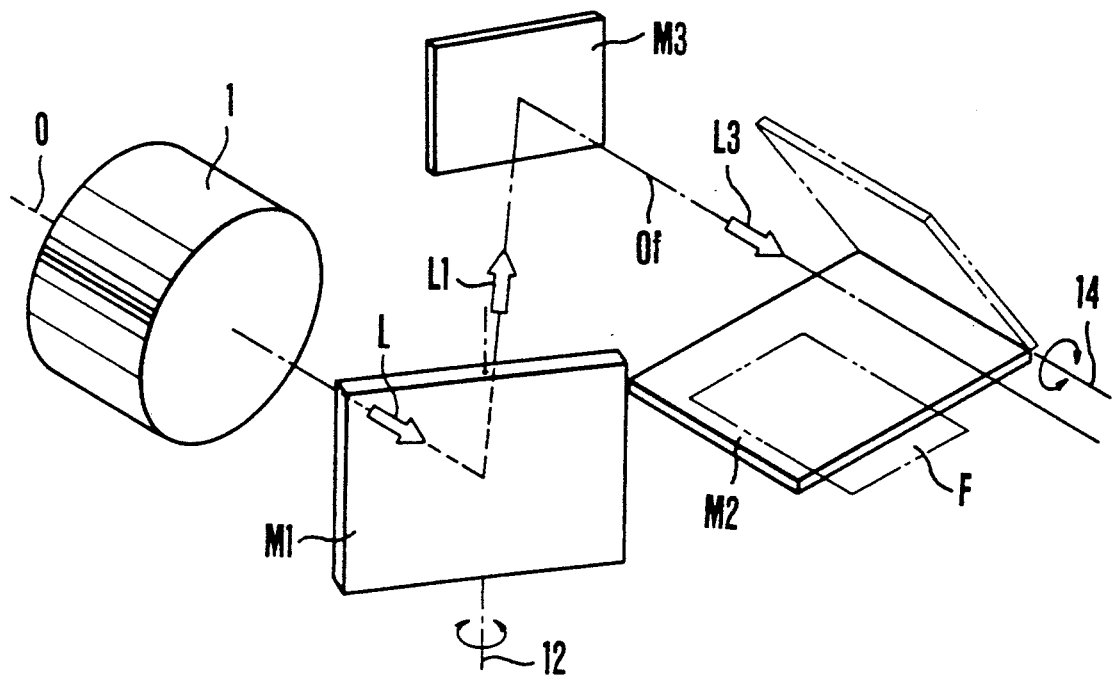
FIG. 20 is a perspective view of a twelfth embodiment according to the invention.

In FIG. 20, when observing the finder image, the first reflection mirror M1 is turned so that the first reflected light beam L1 is conducted to the third reflection mirror M3 positioned side with respect by side to the photographic lens 1. Then, the third reflection mirror M3 is so oriented that the third reflected light beam L3 goes in a path parallel to the optical axis O of the photographic lens 1, and is so positioned that it passes either in a space which contains the photographic optical path when the second reflection mirror M2 operates in the photographic system, or near it, before it reaches the eyepiece lens (not shown).

In the present embodiment, the second reflection mirror M2 when retracting from the photographic optical path is made to cover the exposure aperture over the photosensitive plane F. Thus, an additional function as the light shielding member is imparted thereto.

Figure 21A:
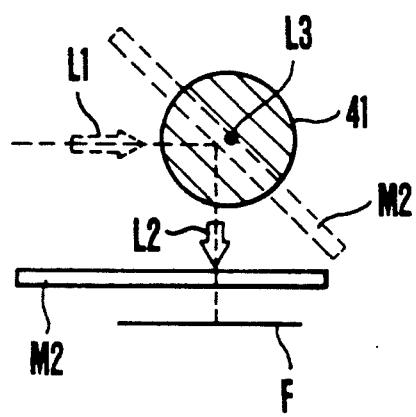
FIGS. 21(A) and 21(B) are elevational views illustrating the spatial relationship of the observing position and the mirror $M_2$ of the twelfth embodiment.

FIG. 21(A) schematically shows the relative position of a light bundle to the second reflection mirror M2 in the invention as viewed from the eyepiece lens 20 toward the third reflection mirror M3.

What is particularly clarified in FIG. 21(A) is the relationship of the first and second reflected light beams L1 and L2 of the photographic system with the third reflected light beam L3 of the finder system.

In FIG. 21(A), reference numeral 41 denotes a bundle of all rays of light reflected from the third reflection mirror M3 of the finder system. It is to be understood from this that in the present embodiment all the elements are so set up that the light bundle 41 passes through a portion of that space in the photographic optical path which the second reflection mirror M2 occupies when making the exposure. The space within the camera housing is thereby effectively utilized to facilitate the reduction of the bulk and size of the whole camera.

Figure 21B:
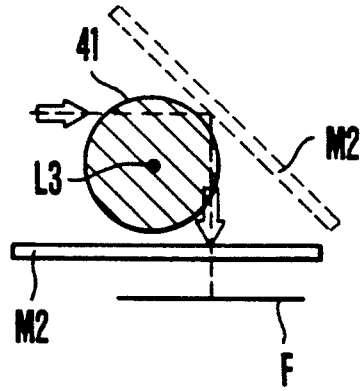

FIG. 21(B) is a schematic diagram illustrating the condition of the light bundle 41 of an example of modification of the orientation of the third reflection mirror M3 altered to displace the light bundle 41 of the finder system toward the first reflection mirror M1. In this example, though it gets harder to aim at the finder image, a further reduction of the bulk and size of the whole camera becomes easy to achieve.

Next, a thirteen embodiment is described by reference to FIGS. 22, 23(A) and 23(B). Even in this embodiment, the elements 20, 21, 22 and 23 shown in FIG. 18 are assumed to be likewise employed. So, their explanation is omitted here.

A finder system formed by turning the first reflection mirror M1 around the axis 12 by a predetermined angle, is described below. Incidentally, the lenses constituting part of the finder system are omitted from FIG. 22.

Figure 22:
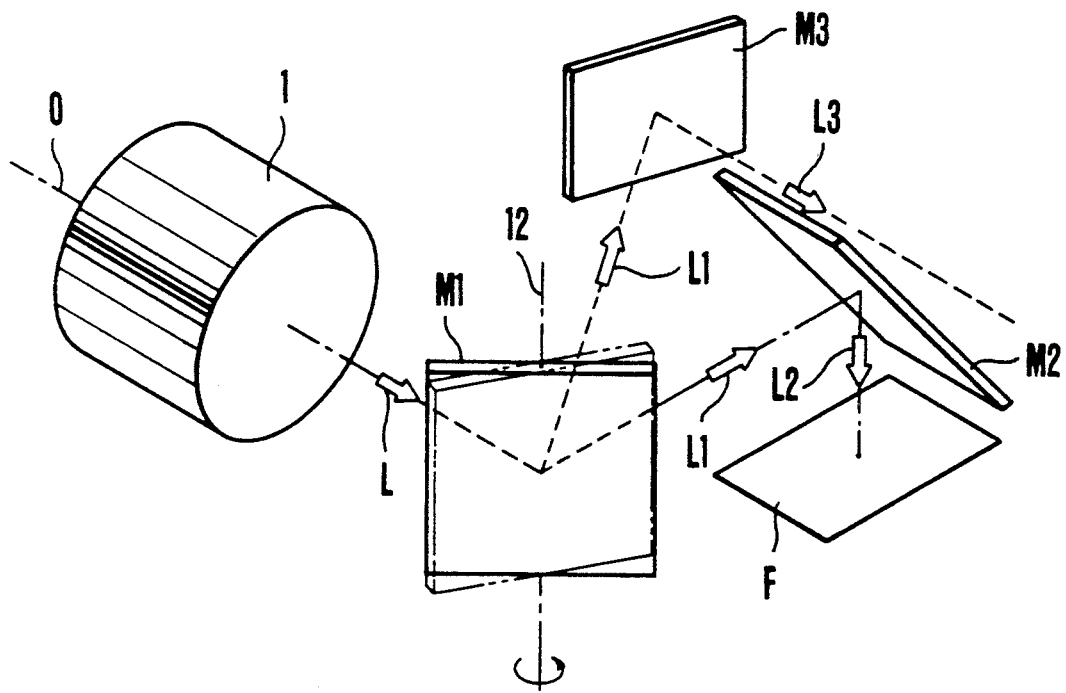
FIG. 22 is a perspective view of a thirteenth embodiment according to the invention.

In FIG. 22, the first reflection mirror M1 is turned so that the first reflected light beam L1 is conducted to the third reflection mirror M3 positioned side by side to the photographic lens 1. And, the third reflection mirror M3 is so oriented and so positioned that the third reflected light beam M3 goes in parallel with the optical axis O of the photographic lens 1 and passes by the back side, or the non-reflection surface, of the second reflection mirror M2, reaching the eyepiece lens (not shown).

In the present embodiment, for the purpose of making it easy to observe the finder image, the finder system is constructed with a parallel arrangement of the first reflection mirror M1 and the third reflection mirror M3 to each other, or a parallel arrangement of the optical axis O of the photographic lens 1 and the optical axis $O_f$ of the finder system to each other.

It should be noted that in the present embodiment, instead of using the parallelism of the optical axis O and the optical axis $O_f$, they may be obliquely disposed according to the aim of the present invention.

Figure 23A:
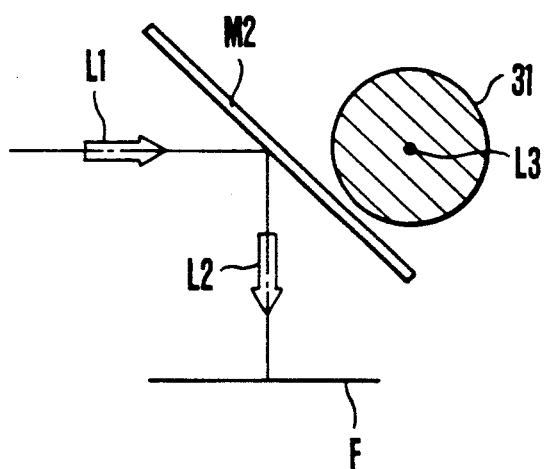
FIGS. 23(A) and 23(B) are elevational views illustrating the spatial relationship of the observing position and the mirror $M_2$ of the thirteenth embodiment.

FIG. 23(A) is a schematic diagram of the relative position of the light bundle to the second reflection mirror M2 in the invention as viewed from the eyepiece lens 20 toward the third reflection mirror M3.

What is particularly clarified in the same figure is the relationship of the first and second reflected light beams L1 and L2 of the photographic system with the reflected light beam L3 of the finder system.

In FIG. 23(A), reference numeral 31 denotes a bundle of all rays of light reflected from the third reflection mirror M3 of the finder system. In the present embodiment, all the elements are so set up that the light bundle 31 passes through one domain behind the back side of the second reflection mirror M2. The space within the camera housing is thereby effectively utilized to facilitate the reduction of the bulk and size of the whole camera.

Figure 23B:
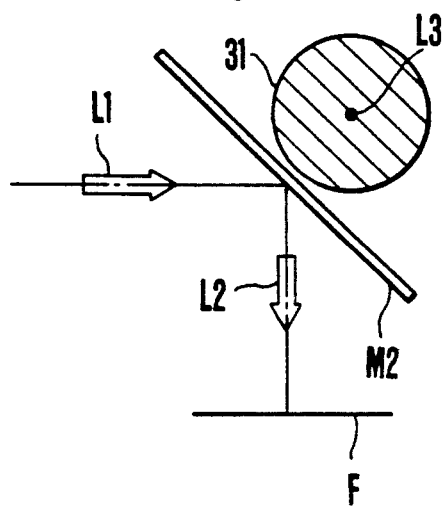

FIG. 23(B) is a schematic diagram of the relative position of the light bundle in an example of modification with the inclination of the third reflection mirror M3 in FIG. 22 being altered to displace the light bundle 31 of the finder system upward along the back surface of the second reflection mirror M2. In FIG. 23(B), the optical axis O of the photographic lens 1 and the optical axis $O_f$ of the finder system are not parallel to each other, causing the aiming at the finder image to become harder. But it becomes easier to reduce the bulk and size of the whole camera.

Figure 24:
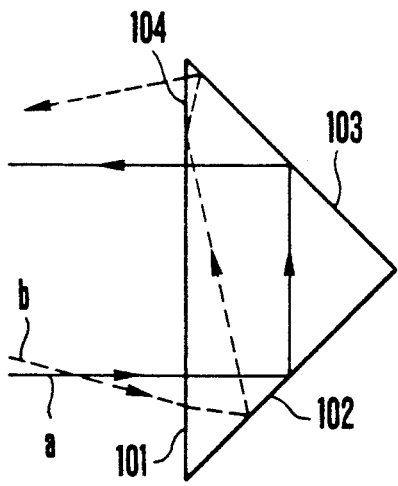
FIG. 24 is a diagram for explaining the cause a ghost produce due to the prism.

By the way, what becomes a problem in the finder optical system for the photographic camera or a video camera is the treatment of ghost produced from the inside of the system. The main cause of a ghost is attributable to the shape of a the prism built in the system. FIG. 24 is a schematic diagram of the shape of the prism used in a portion of the common finder optical system.

With the prism of such shape when used in the finder optical system, light travels as follows.

At first, light enters into the prism at its entrance face 101. It then reflects from a first reflection face 102 and a second reflection face 103 successively, and then emerges from an exit face 104. A ray of light whose path is changed 180 degrees in passing through this normal route is designated by a solid line "a".

In fact, however, the incident light contains a wide variety of rays of different angles. Among them there is included a ray having a path shown by a dashed line "b" and exits. This ray, after having entered at the entrance face 101 and reflected from the reflection face 102, goes a different way from that of the normal ray so that it is totally reflected from the exit face 104 and impinges on the reflection face 103, finally getting out of the exit face 104. Because of its having traveled along the different course from the normal one, the skew ray has an utterly different property from that of the desired ray, concretely speaking, substantially lowering the quality of the finder observation by appearing as ghost light.

The simplest means for removing this ghost is to increase the size of the prism itself so that such light as the ray "b" can scarcely occur.

However, today a compact form of the whole camera is desired. The use of such means invites an increase in the height and width of the prism, causing the finder system and, in turn, the whole camera, to be undesirably increased in size. With this point in mind, the invention has for an additional object to remove the ghost without substantially changing the effective size of the prism.

According to the invention, a solution of the above-described problem is proposed by devising a novel shape for the prism.

That is, considering the fact that the main cause of the ghost is the total reflection of the exit face 104 existing between the first reflection face 102 and the second reflection face 103, (A): the exit face of the right angle prism for bending 180° the finder optical path is formed as projecting from the entrance face by an amount equal to 1/20 to ¼ of the length of the cross-section of the exit face; and (B): the ghost light that has a lower possibility of striking on the exit face 104 as the result of (A) is guided to the side wall, thus getting away from the finder optical path. By these means, the object of the invention is accomplished.

Figure 25:
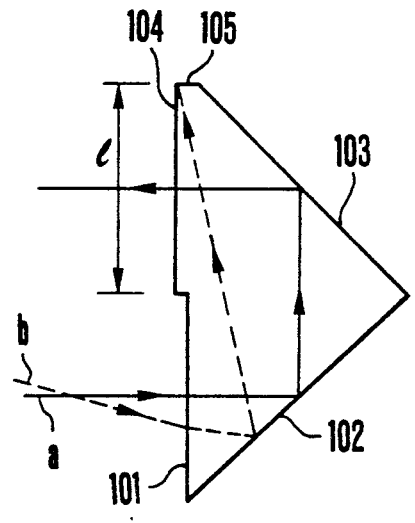
FIG. 25 illustrates the construction of means for removing the stray light concerning the invention.

FIG. 25 is a schematic diagram of an embodiment of the prism to be used in the finder optical system of the invention. The prism of this embodiment has its shape made similar to that previously shown in FIG. 24 with respect to the entrance face 101 perpendicular to the axis of the incidence light beam on the prism up to the reflection faces 102 and 103 which a make 45° therewith.

But, a first different feature of the prism of the invention is in the construction of an exit face 104. In this figure, the exit face 104 is formed in such a shape that it projects from a plane containing the entrance face 101 by 1/10 of the length of the cross-section of the exit face 104. As a result, as shown by a broken line, the ray "b" which would become a ghost light in FIG. 14 does not arrive at the exit face 104.

A second different feature of the prism of the present embodiment is that the ghost source ray "b" that does not impinge on the exit face 104 is guided to a side wall 105. By applying a light absorption means such as black coating to the side wall 105, the stray light "b" is absorbed. Hence no ghost appears when the finder image is observed.

In the embodiment of FIG. 25, the size of the prism is increased in the lateral direction or in width by 1/10 of the length 1 of the exit face. This is reflected by an increase of the length of the optical prism by only 1/10N where N is the refractive index of the prism. The resultant drop of the finder magnification also can be ignored. Further, in the present embodiment, the size of the prism in height is not increased. In other words, by making the planes of the entrance side and the exit side differ from each other by some step, the same effect as that obtained by simply increasing the size of the right angle prism of FIG. 24 against the ghost can be produced although the prism is far more compact.

The amount of projection is said in the present embodiment to be 1/10 of the length of the exit face. Yet, for actual application, it is desired that it lies in a range of from 1/20 to ¼ of the length of the exit face.

Figure 26A:
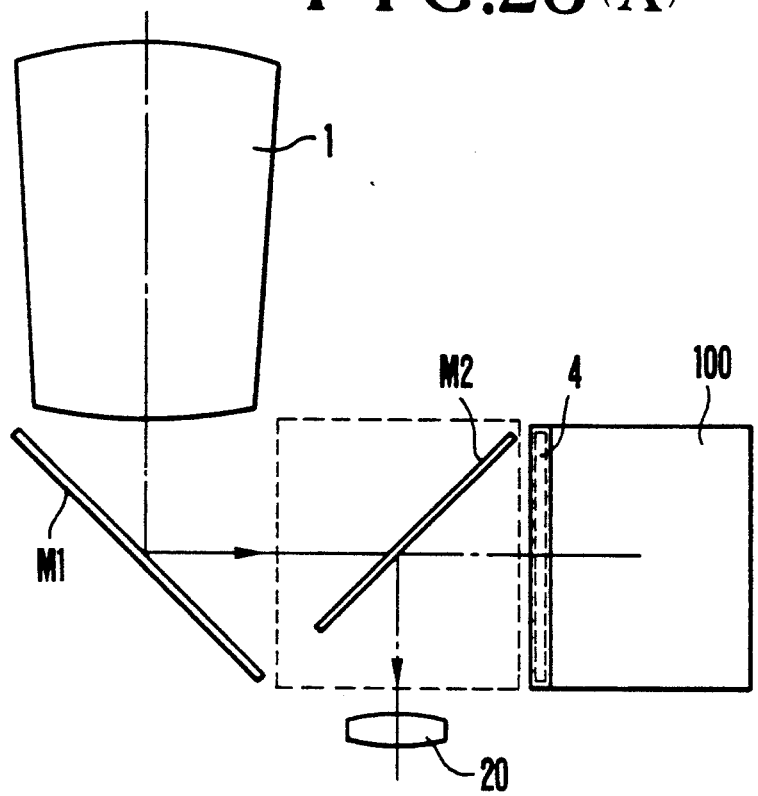
FIGS. 26(A) and 26(B) illustrate the arrangement of means for removing the stray light concerning the invention.
Figure 26B:
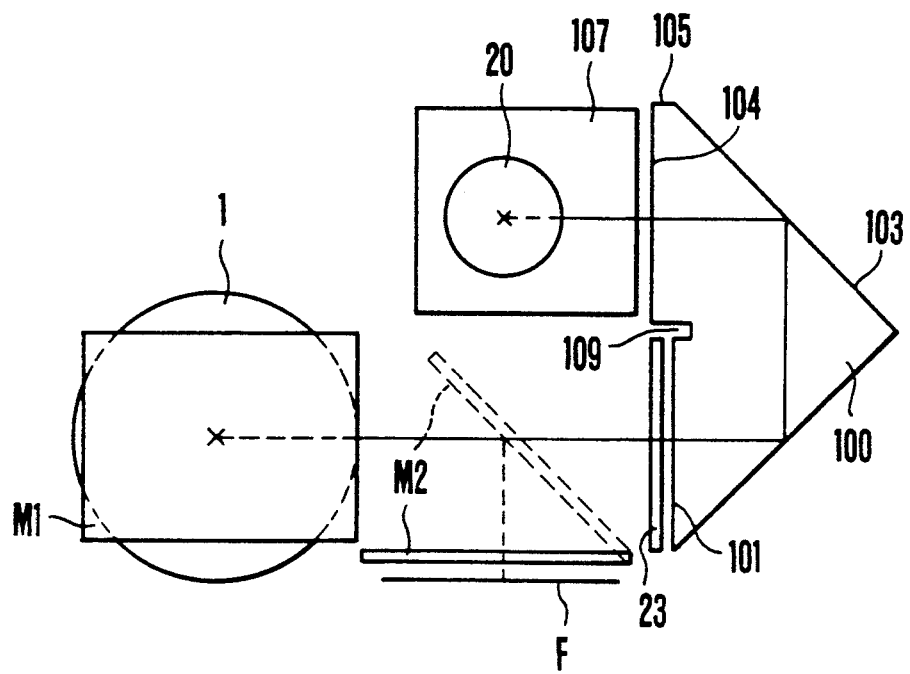

FIGS. 26(A) and 26(B) are schematic views of an embodiment of the finder optical system according to the invention.

In FIG. 26(A), light emerging from the photographic lens 1 is first subjected to reflection by a first mirror M1. A second mirror M2 is movable. When making an exposure, it takes a position shown by the broken line where the light beam from the first mirror M1 is reflected to a film plane F positioned below. When observing by the finder, the second mirror M2 retracts to a position shown by the solid line in FIG. 26(B), where the light beam goes straight, forming an image on a focusing screen 4. The ones of the constituent parts of the finder which follow this form are examples of an application of the invention. A right angle prism 100 works to bend the optical path 180°. After that, the light is reflected by a reflection mirror 107 to an eyepiece lens 20.

Even in this form of the camera, the ghost of the finder system gives rise to a problem. Here, if an attempt is made to remove the ghost by the conventional type of prism such as that shown in FIG. 24, a drawback will arise that the size of the whole prism is caused to increase, which in turn causes the height and width of the camera to increase rapidly. The increase of the size of the prism further means that the distance from the focusing screen 4 to the eyepiece lens 20 increases. As a result, the required focal length for the eyepiece lens 20 becomes long. This constitutes another drawback that the finder magnification is caused to be lower. But, by adopting a prism whose exit face 104 slightly projects out of a plane containing the entrance face 101 as in the invention, without having to increase the height, only when the width is slightly increased, it has become possible to remove ghost from the finder image. Further, in this case, the resultant decrease of the finder magnification is very slight, falling in an allowable range. Compared with the prior art of which simply enlarges the prism which is reflected to equal the increase in the length of the optical path across the prism, the present invention has a prism obtained by altering the prior known prism only in between the last reflection face 103 and the exit face 104, but achieves the same effect. Hence, the production of these two advantages of size and magnification can be said to be a matter of course.

It should be noted that the prism of FIG. 26(B) is provided with a light shielding groove 109 in the boundary between the entrance face and the exit face. This groove too has the effect of blocking ghost light as is easily understandable from the optical path of the ghost light shown in FIG. 25. This results in the possibility of reducing the amount of projection of the exit face necessary to remove the ghost and, therefore, minimizing the increase of the size and the decrease of the finder magnification.

Also, in the case of using a focusing screen 4 of high diffusion, the prism of the invention is effective. The focusing screen 4 is arranged just in front of the prism. That diffusion occurs here means that the angle distribution of the light rays incident on the prism 100 expands. Because of this, a ghost is liable to be produced. If an attempt is made to remove all the ghosts by using a conventional type of prism, the prism 100 must be considerably increased in size to provide such a safety margin. The prism of the invention, on the other hand, after the analysis of the cause of the production of ghost light, effectively copes with this and, therefore, the present invention is advantageous even when applied to a finder optical system of the type in which diffusion plate is used.

Now, the production of a ghost in the optical system of the above-described embodiments is described below.

Figure 27A:
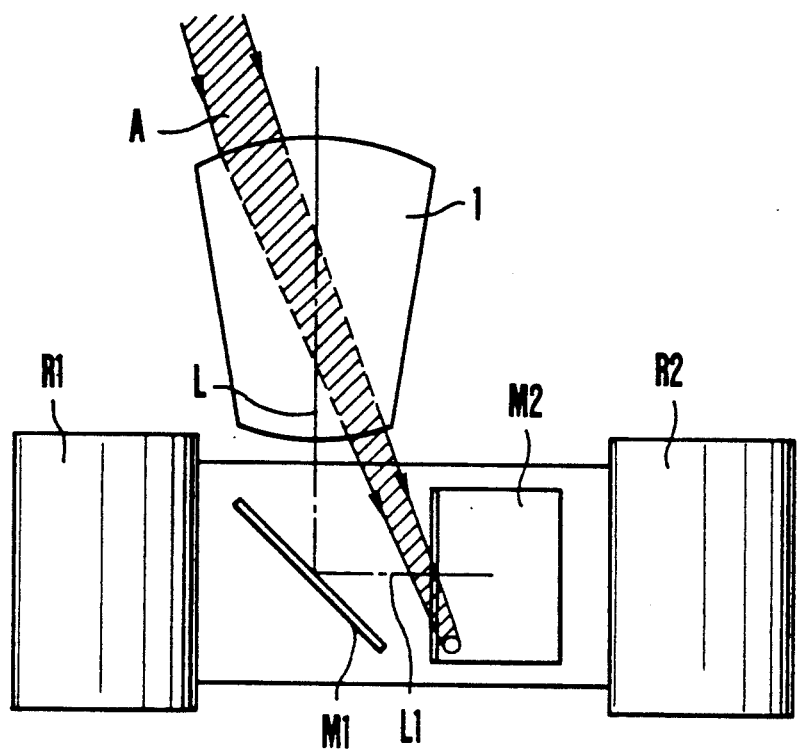
FIGS. 27(A) and 27(B) are diagram for explaining the production of the stray light with FIG. 27(A) being a top plan view of the camera and FIG. 27(B) being an elevational view viewed from behind the camera.
Figure 27B:
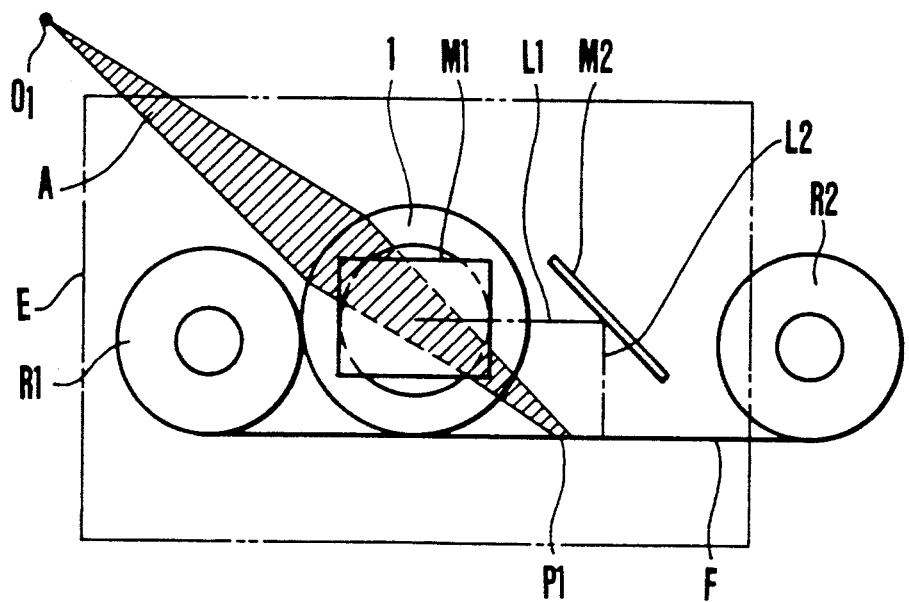

FIGS. 27(A) and 27(B) are respectively a top view and a back view of the photographic system excluding the finder system of the above-described embodiment. Incidentally, E represents a field to be photographed. $O_1$ and $O_2$ represent object points outside the field to be photographed.

A stray light beam A issues from the object point $O_1$ near one corner of the field E to photograph. Another stray light beam B issues from the object point $O_2$ near the upper margin of the field E to photograph. $R_1$ is a film cartridge. $R_2$ is a film take-up spool.

Incidentally, the first reflection mirror M1 and the second reflection mirror M2 each are in the form of a flat reflection mirror, and each reflection surface utilizes the front reflection surface.

In FIGS. 27(A) and 27(B), the stray light beam A which is to reach a position $P_1$ on the photosensitive plane F issues from the object point $O_1$ outside the field E to photograph corresponding to the effective size of film (in the 35 mm half-size film, 18 mm×24 mm) and, after having passed through the photographic lens 1, reaches directly the photosensitive plane F without meeting the first reflection mirror M1 and the second reflection mirror M2.

Figure 28A:
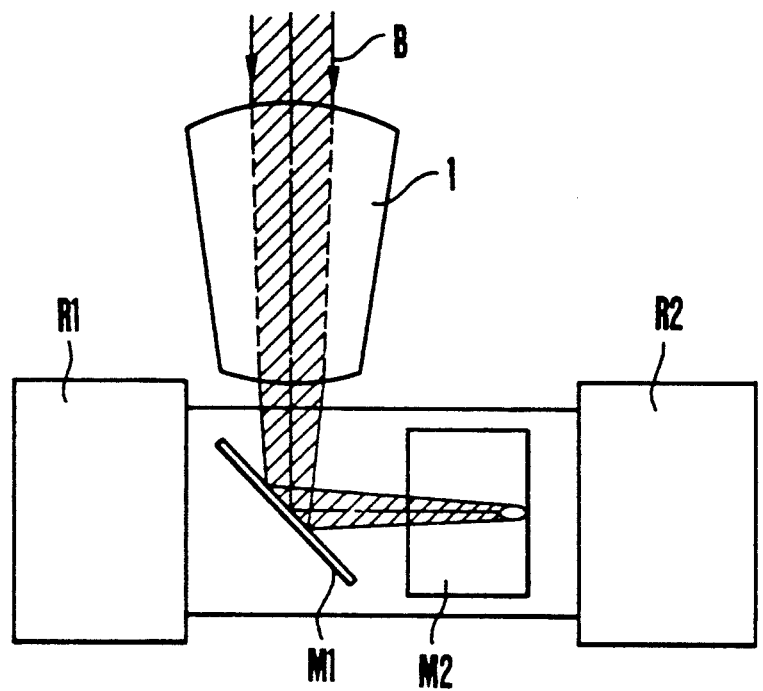
FIGS. 28(A) and 28(B) are diagrams for explaining the production of the stray light with FIG. 28(A) being a top view of the camera and FIG. 28(B) being an elevational back view thereof.
Figure 28B:
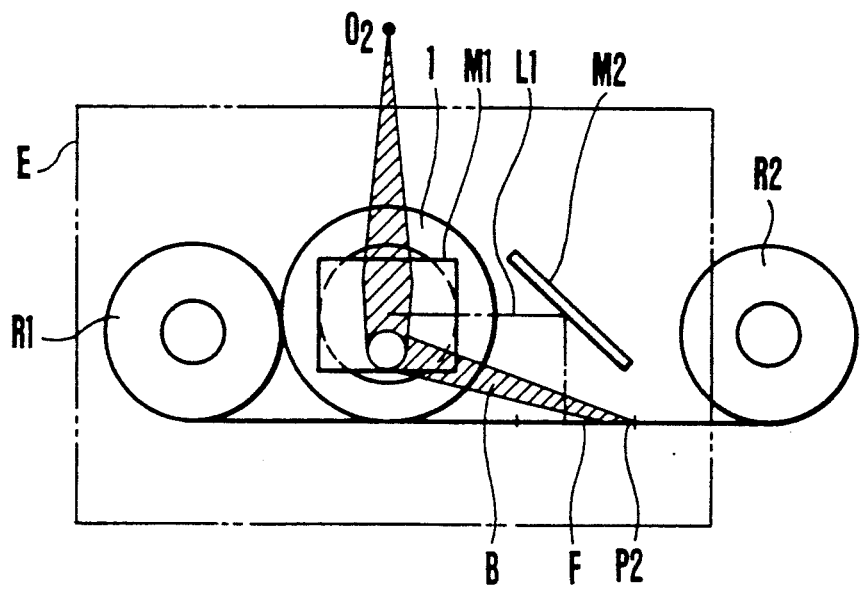

Also, in FIGS. 28(A) and 28(B), the stray light beam B which is to reach a position $P_2$ on the photosensitive plane F issues from the object point $O_2$ outside the field E to photograph, passes through the photographic lens 1 and, after having been reflected from the first reflection mirror M1, reaches directly the photosensitive plane F without meeting the second reflection mirror M2.

In such a manner, in the conventional photographic system there are occasions that the stray light beams issuing from the object points $O_1$ and $O_2$ outside the field E to be photographed, after having passed through the photographic lens 1, do not meet the first reflection mirror M1 or the second reflection mirror M2, but reach directly the photosensitive plane F. These stray light beams, because they lower the image quality, are objectionable.

Also, to achieve a reduction of the size of the camera, the spaces between the reflection mirrors and the photosensitive plane, particularly the space between the second reflection mirror M2 and the photosensitive plane F, may be shortened. If this method is used, that area of the photosensitive plane F which is exposed to the stray light can be further widened. Therefore, it is difficult to achieve a reduction of the bulk and size of the camera.

Next, an embodiment of the invention where by arranging a light shielding member in the space between the first reflection mirror and the photosensitive plane and by specifying its proper shape, the stray light beam from outside of the field to be photographed is blocked by the light shielding member and also the ghost light beam produced at the interior of the camera and the aforesaid stray light beam are suppressed with a good efficiency, and the whole camera is easily reduced in size, is described.

FIG. 29(A) is a schematic view of the main parts as viewed from the top of the camera, and FIG. 29(B) is a schematic view of the main parts as viewed from the direction indicated by arrow "b" in FIG. 29(A).

In these figures, a first reflection mirror M1 is disposed at 45° with respect to an optical axis of a photographic lens 1. A second reflection mirror M2 is disposed at about 45° with respect to a first reflected light beam L1. It should be noted that these reflection mirrors are constructed in the form of flat plate mirrors, and that for the reflection surface, the front reflection surface is utilized. A photosensitive plane F is positioned parallel to the optical axis of the photographic lens 1. $R_1$ is a film cartridge, and $R_2$ is a film take-up spool.

L is an axial light beam passing through the photographic lens 1. L1 is a first reflected light beam formed by reflecting the light beam L from the first reflection mirror M1 in about a 90° direction. L2 is a second reflected light beam formed by reflecting the light beam L1 from the second reflection mirror M2 in about a 90° direction with respect to a plane formed by the photographic lens 1 and the first reflected light beam L1.

S is a light shielding member formed in a rectangular shape of such extent that the effective light beam from the photographic lens 1 is not blocked and arranged in a space between the first reflection mirror M1 and the photosensitive plane F. In the present embodiment, the photographic lens 1 and the first and second reflection mirrors M1 and M2 constitute a photographic system.

In the present embodiment, the light beam from the photographic lens 1 is reflected as the first reflected light beam L1 by the first reflection mirror M1 in a direction almost perpendicular to the optical axis of the photographic lens 1 and in a direction parallel to the photosensitive plane, then reflected as the second reflected light beam L2 by the second reflection mirror M2 in a direction almost perpendicular to a plane formed by the optical axis of the photographic lens 1 and the first reflected light beam L1 and toward the photosensitive plane F, and then impinges on the photosensitive plane F. By this, a picture of an object to be photographed is taken.

Also, in the present embodiment, the light shielding member S is arranged in the space between the first reflection mirror M1 and the photosensitive plane 1 to shut off the stray light beams issuing from the object points outside the field to be photographed, while permitting the effective light beam for photography to reach the photosensitive plane F.

FIG. 30 is a schematic diagram of the main parts illustrating how the light shielding member S shown in FIGS. 29(A) and 29(B) shuts off the stray light beams.

In FIG. 30, the same elements as those shown in FIGS. 29(A) and 29(B) are denoted by the same reference characters. A and B are the stray light beams issuing from the aforesaid object points $O_1$ and $O_2$ respectively.

Each of the stray light beams A and B is blocked by the light shielding member S as shown in FIG. 30 from reaching the photosensitive plane F. Yet, the normal light beam from the second reflection mirror M2 or the second reflected light beam L2 only is conducted to the photosensitive plane F.

In the present embodiment, in order that the photographic effective light beam reflected from the first reflection mirror M1 and the second reflection mirror M2 is permitted to reach the photosensitive plane with a good efficiency without being mutilated more than necessary by the light shielding member S, it is proper that the light shielding member S, taking the photosensitive plane F as the start point, has its height H in a direction perpendicular to the photosensitive plane F satisfying the following condition:

$T/20 < H < T$ ... (1)

where T is the length of the photosensitive plane F in a direction parallel to the optical axis between the first reflection mirror M1 and the second reflection mirror M2.

In the inequalities of condition (1), when the height H of the light shielding member S is too low beyond the lower limit, it is not good because it becomes difficult to perfectly block the stray light beam by the light shielding member S.

Also, when it is too high beyond the upper limit, the distance between the reflection mirror and the photosensitive plane must be increased. Otherwise, the photographic effective light beam would be mutilated more than necessary. So it is not good because the whole camera increases in size.

FIG. 31(A) and FIG. 31(B) are schematic views of another embodiment of the optical system having optical path bending means according to the invention.

In these figures, the same elements as those shown in FIGS. 29(A) and 29(B) are denoted by the same reference characters. FIG. 31(A) is the schematic view of the main parts as viewed from the top of the camera. FIG. 31(B) is the schematic view of the parts as looked from the direction of arrow "b" shown in FIG. 31(A).

S1 and S2 are first and second light shielding members respectively formed in rectangular shapes of such extent that the effective light beam from the photographic lens 1 is not blocked, and arranged optically in a space between the first reflection mirror M1 and the photosensitive plane F.

$S_3$ is a third light shielding member positioned below the first reflection mirror M1.

In the present embodiment, the upper portion of the first light shielding member S1 is formed to an abutment for the second reflection mirror M2, so that the second reflection mirror M2 rests stationary as shown by the broken line to serve as a cover for the film except when making the exposure. For the other time, it is used in viewing the finder image or performing other functions.

Also, in the present embodiment, to reduce the ghost produced at the interior of the camera, the third light shielding member $S_3$ is provided as positioned below the first reflection mirror M1 so that the ghost light beam does not reach the photosensitive plane.

Further, as shown in FIG. 31(B), the third light shielding member S3 and the light shielding member S1 are made to differ largely in height from each other to reduce the mechanical ghost.

It should be noted that in the embodiment shown in those figures, so long as the first light shielding member S1 and the second light shielding member S2 are so designed that their heights H each satisfy the above-described condition (1), the light shielding members S1 and S2 may be formed of different heights from each other.

Also, though in the present embodiment the shape of the light shielding member has been defined to be rectangular, the invention is not confined to the rectangular shape provided the condition (1) is satisfied. It may be formed in a shape having different heights from part to part, for example, a trapezoidal shape, convex shape, concave shape, polygonal shape, or curved shape.

It should be noted that though in the present embodiment the first reflection mirror M1 and the second reflection mirror M2 each have been constructed in the form of a flat plate reflection mirror whose front surface is used as the reflection surface, they may be constructed by using a prism of the reflection type instead of the flat plate reflection mirror.

Particularly in the case of using the prism in constructing the photographic system, the light shielding members operates more effectively to remove the unnecessary total reflection ghost, etc.

What is claimed:

1. A single-lens reflex camera comprising:
   a first reflection member for reflecting light emerging from a photographic lens;
   a second reflection member for conducting the light reflected from said first reflection member to a photosensitive plane;
   an eyepiece lens; and
   means for driving said second reflection member to conduct the light reflected from said first reflection member to said eyepiece lens, wherein an optical axis of the photographic lens is parallel to the photosensitive plane.

2. A camera according to claim 1, wherein said second reflection mirror has both surfaces formed into mirrors, one surface of which conducts the light reflected from said first reflection member to said photosensitive plane and the other surface of which conducts the light reflected from said first reflection member to said eyepiece lens.

3. A camera according to claim 2, further comprising a third reflection member having third and fourth reflection surfaces, wherein the light reflected from said other surface of said second reflection member is reflected by said third and fourth reflection surfaces to be conducted to said eyepiece lens.

4. A camera according to claim 3, wherein said third reflection member comprises a prism unit.

5. A camera according to claim 1, further comprising a third reflection member, wherein when conducting the light reflected from said first reflection member to said eyepiece lens, said second reflection member is turned around its one end toward said photosensitive plane to create a space into which said third reflection member then enters to conduct the light to said eyepiece lens.

6. A camera according to claim 5, wherein said third reflection member reflects light so that the reflected light travels parallel to an optical axis of the photographic lens.

7. A camera according to claim 6, further comprising a fourth reflection member having fourth and fifth reflection surfaces, wherein the light reflected from said third reflection member is further conducted by said fourth and fifth reflection surfaces to said eyepiece lens.

8. A camera according to claim 7, wherein said fourth surfaces are reflection parts of a prism unit.

9. A camera according to claim 1, wherein said second reflection member retracts out of the light reflected by said first reflection member.

10. A camera according to claim 9, wherein said second reflection member tilts around its one end toward the photosensitive plane.

11. A camera according to claim 9 or 10, wherein the light reflected from said first reflection member is conducted by third, fourth and fifth reflection surfaces to said eyepiece lens.

12. A camera according to claim 1 or 2 or 5, wherein an optical axis of the photographic lens and an optical axis of said eyepiece lens are parallel to each other.

13. A single-lens reflex camera comprising:
a first reflection member for reflecting light emerging from a photographic lens;
a second reflection member for conducting the light reflected from said first reflection member to a photosensitive plane;
an eyepiece lens;
means for driving said second reflection member to conduct the light reflected from said first reflection member to said eyepiece lens;
a third reflection member adapted to be inserted in a space produced by driving said second reflection member by said driving means; and
an image forming lens and at least two reflection mirrors positioned in an optical path of the light reflected from said third reflection member to said eyepiece lens.

14. A camera according to claim 13, wherein said two reflection mirrors constitute a roof-type mirror.

15. A camera according to claim 13, wherein an optical axis of the photographic lens and an optical axis of said eyepiece lens are parallel to each other and the photosensitive plane is parallel to a plane containing said optical axes.

16. A camera comprising:
a first reflection member for reflecting light emerging from a photographic lens;
a second reflection member for conducting the light reflected from said first reflection member to a photosensitive plane;
an eyepiece lens; and
means for turning said first reflection member around a predetermined axis to reflect and conduct the light emerging from the photographic lens to said eyepiece lens.

17. A camera according to claim 16, further comprising a third reflection member for conducting the light reflected from said first reflection member to said eyepiece lens.

18. A camera according to claim 16 or 17, further comprising an image forming lens positioned in an optical path from said second reflection member to said eyepiece lens.

19. A camera comprising:
a first reflection member for reflecting light emerging from a photographic lens;
a second reflection member for conducting the light reflected from said first reflection member to a photosensitive plane, wherein the photosensitive plane is parallel to an optical axis of the photographic lens; and
non-shutter light restricting means elongated in the direction of the optical axis of the photographic lens, arranged in a space between said first and said second reflection members and having a predetermined height, for preventing stray light from reaching the photosensitive plane, wherein said second reflection member introduces the light directly to the photosensitive plane without passing through said light restricting means, and wherein said light restricting means satisfies the following condition:

$T/20 < H < T$ where H is a height of said light restricting means as measured from the photosensitive plane as a starting point in a direction perpendicular to the photosensitive plane, and T is a length of the photosensitive plane in a direction parallel to the optical axis between said first reflection member and said second reflection member.

20. A camera according to claim 19, wherein said second reflection member bends light in a direction parallel to the direction of the optical axis of the photographic lens and in a direction perpendicular to a direction in which said first reflection member reflects light.

21. A compact camera comprising:
a photographic lens having an optical axis parallel to a film plane; and
two reflection surfaces both located above the film plane positioned behind said photographic lens and both located directly between a film chamber into which unexposed film is loaded and another film chamber in which an exposed film is taken up, said first reflection surface reflecting a light beam having passed through said photographic lens so as to be perpendicular to an optical axis of said photographic lens and parallel with the film plane, said second reflection surface reflecting the light beam perpendicular to a plane containing the optical axis of said photographic lens and an optical axis bent by said first reflection surface, so that the optical axis bent by said second reflection surface is made perpendicular to the film plane and an effective image frame of the film plane has its long side parallel to the optical axis of said photographic lens.

* * * * *

UNITED STATES PATENT AND TRADEMARK OFFICE
CERTIFICATE OF CORRECTION

PATENT NO. : 5,253,005
DATED : October 12, 1993
INVENTOR(S) : Takeshi KOYAMA, et al.

It is certified that error appears in the above-identified patent and that said Letters Patent is hereby corrected as shown below:

On the title page: Item

[75] Inventors:
"Takeshi Koyama; Sadatoshi Takahashi; Nozomu Kitagishi, all of Tokyo; Kouji Oizumi, Kanagawa," should read --Takeshi Koyama; Sadatoshi Takahashi, both of Tokyo; Nozomu Kitagishi, Hachioji; Kouji Oizumi, Yokahama,--.

Column 2
    Line 52, "cause a" should read --cause of a--.
    Line 53, "produce" should read --produced--.

Column 3
    Line 18, "with" should read --with respect to--.

Column 4
    Lines 39 and 40, "sideways long" should read --long sideways image--.

Column 5
    Line 47, "as for" should be deleted.
    Line 48, "omission is made." should read --is omitted--.
    Line 65, "parts" should be deleted.

Column 6
    Line 1, "air reduced length" should be deleted.
    Line 16, "10" should read --Reference numeral 10--.
    Line 18, ""e"" should read --The letter "e"--.
    Line 22, "erecting" should read --erect,--.
    Line 59, "erecting a" should read --erect,--.

Column 7
    Line 32, "erecting" should read --erect,--.
    Line 36, "surface" should read --surfaces--.

UNITED STATES PATENT AND TRADEMARK OFFICE
CERTIFICATE OF CORRECTION

PATENT NO. : 5,253,005

DATED : October 12, 1993

INVENTOR(S) : Takeshi KOYAMA, et al.

It is certified that error appears in the above-identified patent and that said Letters Patent is hereby corrected as shown below:

Column 9
    Line 5, "erecting," should read --erect,--.
    Line 6, "reverse" should read --reversed--.
    Line 27, "monomer," should read --manner.--.
    Line 46, "FIG. 13. So" should read --FIG. 13, so--.

Column 10
    Line 8, "erecting" should read --erect,--.
    Line 57, "in" should read --is a--; and "shows" should read --showing--.

Column 11
    Line 1, "erecting" should read --erect,--.
    Line 49, "side with respect by side" should read --side by side with respect--.

Column 12
    Line 22, "thirteen" should read --thirteenth--.
    Line 33, "side to" should read --side with respect to--.
    Line 34, "And," should read --Also,--.
    Line 36, "goes" should read --travels--.

Column 13
    Line 10, "But" should read --However,--.
    Line 14, "ghost" should read --a ghost--.
    Line 16, "a" should be deleted.
    Line 29, "having" should read --which travels--.

Columm 14
    Line 4, "a make" should read --make a--; and "45°" should read --45° angle--.

UNITED STATES PATENT AND TRADEMARK OFFICE
CERTIFICATE OF CORRECTION

PATENT NO. : 5,253,005
DATED : October 12, 1993
INVENTOR(S) : Takeshi KOYAMA, et al.

It is certified that error appears in the above-identified patent and that said Letters Patent is hereby corrected as shown below:

Column 14 (cont'd)
   Line 6, "But," should read --However,--.
   Line 50, "ones of the" should be deleted.

Column 15
   Line 3, "ghost" should read --the ghost--.
   Line 6, "of" should be deleted.
   Line 38, "which" should read --which a--.
   Line 50, "to photograph." should read --to be photographed--.
   Line 52, ""to photograph." should read --to be photographed--.
   Line 61, "to photograph" should read --to be photographed--.

Column 16
   Line 2, "to photograph," should read --to be photographed,--.

Column 17
   Line 65, "looked" should read --viewed--.

Column 18
   Line 10, "stationary" should read --stationarily--.
   Line 47, "operates" should read --operate--.
   Line 48, "total refection ghost," should read --total reflection, ghosts,--.
   Line 49, "claimed:" should read --claimed is:--.

UNITED STATES PATENT AND TRADEMARK OFFICE
CERTIFICATE OF CORRECTION

PATENT NO. : 5,253,005
DATED : October 12, 1993
INVENTOR(S) : Takeshi KOYAMA, et al.

It is certified that error appears in the above-identified patent and that said Letters Patent is hereby corrected as shown below:

<u>Column 19</u>
　　Line 27, "surfaces are reflections parts of" should read --reflection member comprises--.

Signed and Sealed this

Fourteenth Day of June, 1994

Attest:

BRUCE LEHMAN

Attesting Officer　　Commissioner of Patents and Trademarks